(12) United States Patent
Kodaka et al.

(10) Patent No.: US 6,317,692 B2
(45) Date of Patent: Nov. 13, 2001

(54) SAFETY RUNNING SYSTEM FOR VEHICLE

(75) Inventors: Kenji Kodaka; Tomoyuki Shinmura; Yoichi Sugimoto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/842,009

(22) Filed: Apr. 26, 2001

Related U.S. Application Data

(62) Division of application No. 09/377,105, filed on Aug. 19, 1999.

(30) Foreign Application Priority Data

Aug. 20, 1998 (JP) .................................................. 10-233733
Aug. 25, 1998 (JP) .................................................. 10-238543
Aug. 25, 1998 (JP) .................................................. 10-238545

(51) Int. Cl.$^7$ ...................................................... G08G 1/16
(52) U.S. Cl. ........................... 701/301; 340/435; 340/903
(58) Field of Search ............................. 701/1, 300, 301, 701/93, 96; 342/70, 455; 340/435, 436, 901, 903

(56) References Cited

U.S. PATENT DOCUMENTS

| | | | |
|---|---|---|---|
| 5,473,538 | * 12/1995 | Fujita et al. | 342/70 |
| 5,572,428 | * 11/1996 | Ishida et al. | 340/903 |
| 5,642,093 | * 6/1997 | Kinoshita et al. | 701/301 |
| 5,680,097 | * 10/1997 | Uemura et al. | 701/301 |
| 5,699,040 | 12/1997 | Matsuda | 340/903 |
| 5,745,870 | * 4/1998 | Yamamoto et al. | 701/301 |
| 5,751,211 | 5/1998 | Shirai et al. | 701/301 |
| 5,754,099 | 5/1998 | Nishimura et al. | 340/435 |
| 5,806,019 | 9/1998 | Ishiyama | 701/300 |
| 5,978,731 | 11/1999 | Matsuda | 701/301 |
| 6,025,797 | 2/2000 | Kawai et al. | 342/70 |

FOREIGN PATENT DOCUMENTS 7-14100    1/1995   (JP) .

* cited by examiner

*Primary Examiner*—Gary Chin
(74) *Attorney, Agent, or Firm*—Arent Fox Kintner Plotkin & Kahn, PLLC

(57) ABSTRACT

In a safety running system, a transverse travelling distance resulting when a subject vehicle travels to a current position of an oncoming vehicle is calculated based on the vehicle velocity and yaw rate of the subject vehicle, a relative transverse distance of the oncoming vehicle relative to a vehicle body axis of the subject vehicle is calculated based on a relative distance, relative velocity and relative angle between the subject vehicle and the oncoming vehicle detected by a radar information processor. When a relative transverse deviation obtained by subtracting the transverse travelling distance from the relative transverse distance resides within a range and that state continues to exist over a predetermined time period, it is judged that there is a collision possibility of the subject vehicle with the oncoming vehicle, and automatic steering is performed so as to avoid a collision.

7 Claims, 22 Drawing Sheets ns a Div. of Ser. No. 09/377,105 filed Aug. 19, 1999.

SAFETY RUNNING SYSTEM FOR VEHICLE

This application is a Div. of Ser. No. 09/377,105 filed Aug. 19, 1999.

BACKGROUND OF THE INVENTION

1. Field of the Invention

The present invention relates to a safety running system for a vehicle for preventing a subject vehicle from coming into contact with an oncoming vehicle on an adjacent lane of the road for opposite traffic by using an object detection unit such as a radar device.

2. Description of the Related Art

A safety running system for a vehicle as described above is well known in the official gazette of Japanese Patent Unexamined Publication (Kokai) No. HEI 7-14100.

The safety running system disclosed in the above official gazette is adapted to avoid a collision of a subject vehicle with an oncoming vehicle on an adjacent lane of the road for opposite traffic by generating an alarm to the driver of the subject vehicle to make the driver perform a voluntary collision avoidance operation or automatically applying the brakes of the subject vehicle in the event that the subject vehicle enters the adjacent lane for opposite traffic to thereby encounter a possible collision with the oncoming vehicle on the same lane.

As shown in FIG. 3, a transverse travelling distance $Y_1$ of the subject vehicle Ai from the vehicle body axis thereof is calculated from a future travelling locus of the subject vehicle Ai estimated based on the vehicle velocity Vi and yaw rate γi thereof. Further, a relative transverse distance $Y_2$ from the vehicle body axis of the subject vehicle Ai to the oncoming vehicle Ao is calculated with a radar device. And, a collision possibility of the subject vehicle Ai with an oncoming vehicle Ao on an adjacent lane for opposite traffic is judged by comparing the transverse travelling distance $Y_1$ with the relative transverse distance $Y_2$.

As shown in FIG. 14, however, in a case where the driver of the subject vehicle Ai tries to overtake a preceding vehicle Af, the driver first steers the steering wheel rightward to change the path of movement of the vehicle to the right-hand side of the road (in the case of left-hand side traffic) and then steers it back leftward to return to the original path of movement of the vehicle or the left-hand side lane after the driver's vehicle Ai has overtaken the preceding vehicle Af. Due to this, with the safety running system described in FIG. 3, there is caused a problem that a possible collision of the subject vehicle with an oncoming vehicle Ao is erroneously judged as occurring as soon as the steering wheel of the subject vehicle is steered rightward even when in reality there is no such collision possibility.

Further, as shown in FIG. 13, when a subject vehicle Ai approaches an end of a rightward curve in a left-hand side traffic road, since the driver steers the steering wheel leftward to enter a straight path from the curved path, an actual transverse travelling distance becomes shorter than an estimated transverse travelling distance $Y_1$. As a result of this, a judgment is made that there is a collision possibility when in reality there is no such collision possibility, this triggering the performance of an unnecessary collision avoidance control, thereby causing a risk of the driver feeling a physical disorder.

Moreover, the aforementioned conventional safety running system is adapted to judge a possible collision with an oncoming vehicle by estimating a deviation of a subject vehicle to an adjacent lane of the road for opposite traffic. Therefore, this deviation to an adjacent lane of the road for opposite traffic is determined in accordance mainly with the azimuth of the travelling subject vehicle (an angle formed by the vehicle body axis of the subject vehicle and the center line of the road). Due to this, for instance in a case where the subject vehicle is steered so as to avoid an obstacle on the road side, an erroneous judgment of a collision possibility is made only when the azimuth of the travelling subject vehicle is temporarily directed to the side of the adjacent lane for opposite traffic, and therefore there is caused a problem that every time such an erroneous judgment is made, an unnecessary collision avoidance control is performed to make the driver feel troublesome.

SUMMARY OF THE INVENTION

The present invention was made in view of the aforesaid circumstances and an object thereof is to prevent the performance of an unnecessary collision avoidance control by making a judgment of a possible collision with an oncoming vehicle in an accurate fashion, and further, to prevent the occurrence of a collision avoidance operation based on an erroneous judgment of a possible collision between the subject vehicle and an oncoming vehicle when the driver of the subject vehicle tries to overtake a preceding vehicle, or when the subject vehicle approaches an exit portion of a curve or bend.

To solve the above object, according to a first aspect of the invention, there is provided a safety running system for a vehicle including, object detection unit for detecting an object existing in a direction in which a subject vehicle travels, a travelling locus estimation unit for estimating a future travelling locus of the subject vehicle, a relative transverse deviation calculation unit for calculating a relative transverse deviation between the subject vehicle and an oncoming vehicle based on the results from the detection by the object detection unit and the future travelling locus of the subject vehicle, a contact possibility judgment unit for judging that there is a contact possibility of the subject vehicle with the oncoming vehicle when the relative transverse deviation calculated by the relative transverse deviation calculation unit falls within a predetermined range, a curve exit detection unit for detecting that the subject vehicle approaches an exit portion of a curve, and a correction unit for correcting the relative transverse deviation based on the results of the detection by the curve exit detection unit.

Further, according to the second aspect of the present invention, there is provided a safety running system including, an object detection unit for detecting an object present in a travelling direction of a subject vehicle, a travelling locus estimation unit for estimating a future travelling locus of the subject vehicle, a relative transverse deviation calculation unit for calculating a relative transverse deviation between the subject vehicle and an oncoming vehicle on an adjacent lane for opposite traffic based on the result of the detection of the object detection unit and a future travelling locus of the subject vehicle estimated by the travelling locus estimation unit, a contact possibility judgment unit for judging that there is a contact possibility of the subject vehicle with the oncoming vehicle when a relative transverse deviation calculated by the relative transverse deviation calculation unit falls within a predetermined range, a contact avoidance unit for automatically performing a contact avoidance operation when the contact possibility judgment unit judges that there is a contact possibility of the subject vehicle with the oncoming vehicle, and an overtaking judgment unit for judging whether or not the subject vehicle is in course of overtaking a preceding vehicle, wherein when the overtaking judgment unit judges that the subject vehicle is in course of overtaking a preceding vehicle, the contact avoidance unit restrains a contact avoidance operation or ceases a contact avoidance operation being performed.

In addition, according to a third aspect of the present invention, there is provided a safety running system comprising, an object detection unit for detecting an object present in a travelling direction of a subject vehicle, a travelling locus estimation unit for estimating a future travelling locus of the subject vehicle, a relative transverse deviation calculation unit for calculating a relative transverse deviation between the subject vehicle and an oncoming vehicle on an adjacent lane for opposite traffic based on the result of the detection of the object detection unit and a future travelling locus of the subject vehicle estimated by the travelling locus estimation unit, a contact possibility judgment unit for judging that there is a contact possibility of the subject vehicle with the oncoming vehicle when a state in which a relative transverse deviation calculated by the relative transverse deviation calculation unit remains within a predetermined range continues for a predetermined time period or longer, and a contact avoidance unit for performing contact avoidance steering when the contact possibility judgment unit judges that there is a contact possibility of the subject vehicle with the oncoming vehicle.

DETAILED DESCRIPTION OF THE PREFERRED EMBODIMENTS

[First Embodiment]

A first embodiment of the present invention, which prevents the occurrence of an erroneous judgment that is a collision possibility between the subject vehicle and an oncoming vehicle when the subject vehicle approaches an exit of a curve or bend will be described below with reference to the accompanying drawings.

Figure 1:
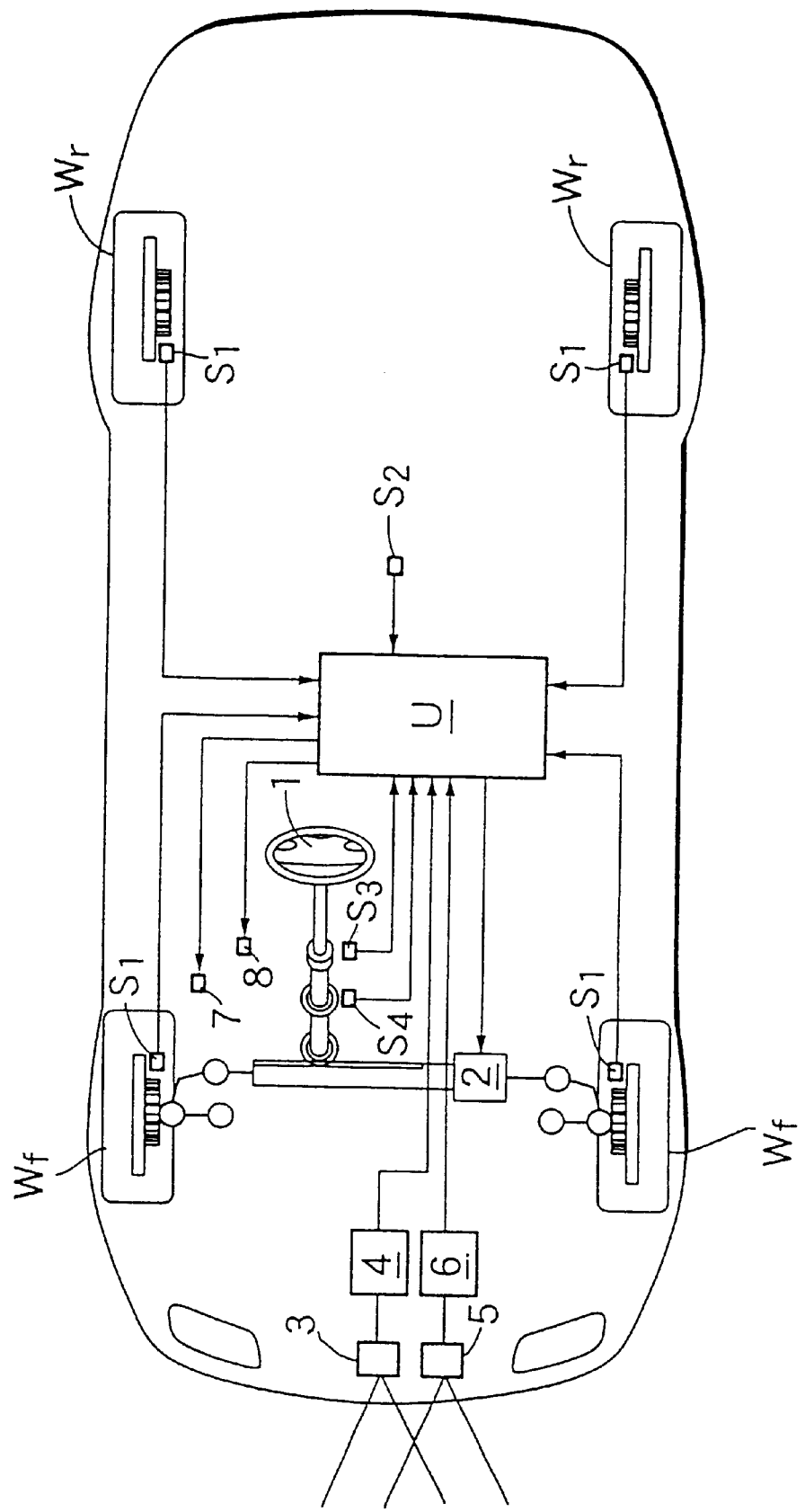
FIG. 1 is an overall structural view of a vehicle equipped with a safety running system according to a first embodiment of the present invention.
Figure 2:
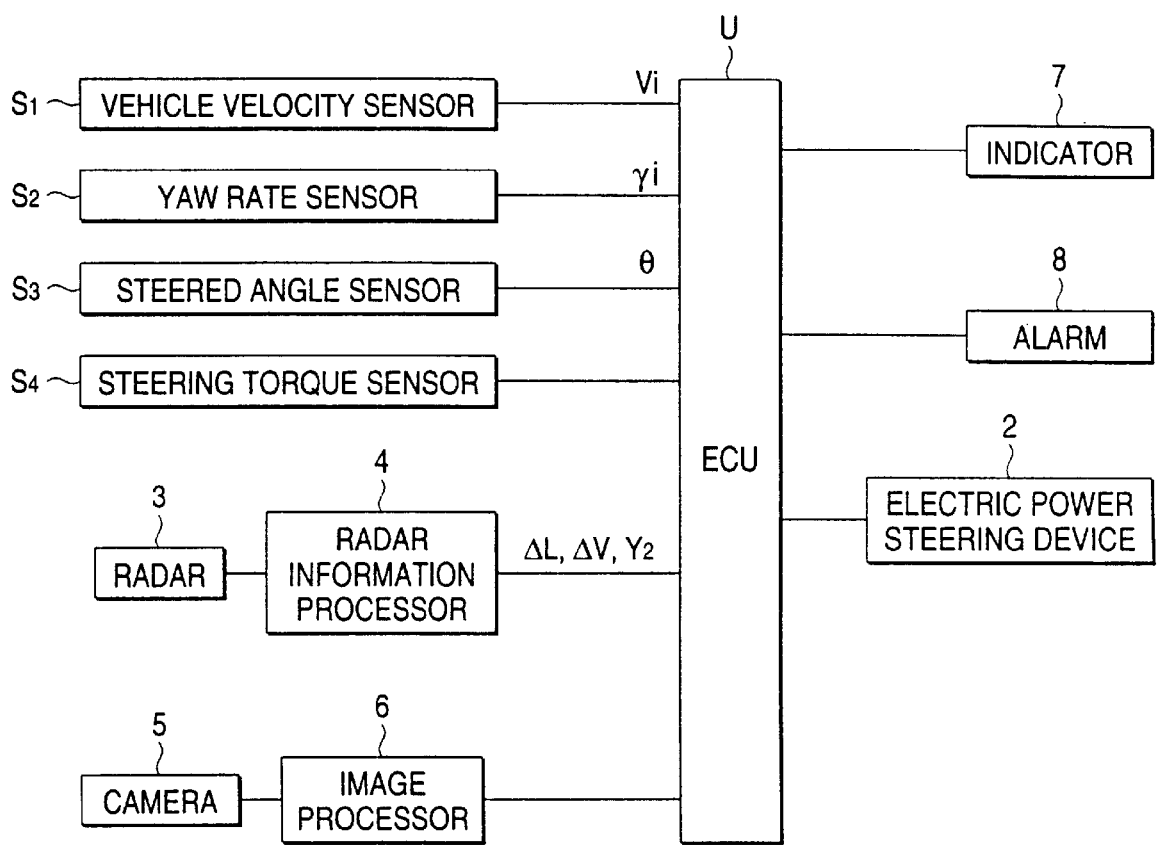
FIG. 2 is a block diagram of the safety running system according to the first embodiment.

FIGS. 1 to 8 show the first embodiment of the present invention. As shown in FIGS. 1 and 2, a vehicle fitted with front left and right wheels Wf, Wf and rear left and right wheels Wr, Wr includes a steering handle or wheel 1 for steering the front left and right wheels Wf, Wf and an electric power steering device 2 for generating a steering force for assisting the driver in operating the steering wheel 1 and avoiding a collision. An electronic control unit U for controlling the operation of the electronic power steering device 2 receives signals input from a radar information processor 4 connected to a radar 3, an image processor 6 connected to a camera 5, vehicle velocity sensors $S_1$ ... for detecting the number of revolutions of the respective wheels Wf, Wf; Wr, Wr, a yaw rate sensor $S_2$ for detecting a yaw rate of the vehicle, a steered angle sensor $S_3$ for detecting an angle at which the steering wheel is steered, and a steering torque sensor $S_4$ for detecting a steering torque applied by the driver to the steering wheel 1. The electronic control unit U controls the electronic power steering device 2 based on signals from the radar information processor 4, image processor 6 and respective sensors $S_1$ ..., $S_2$, $S_3$, $S_4$ and it also controls operations of an indicator 7 composing of a liquid crystal display and an alarm 8 such as a buzzer and lump.

Figure 3:
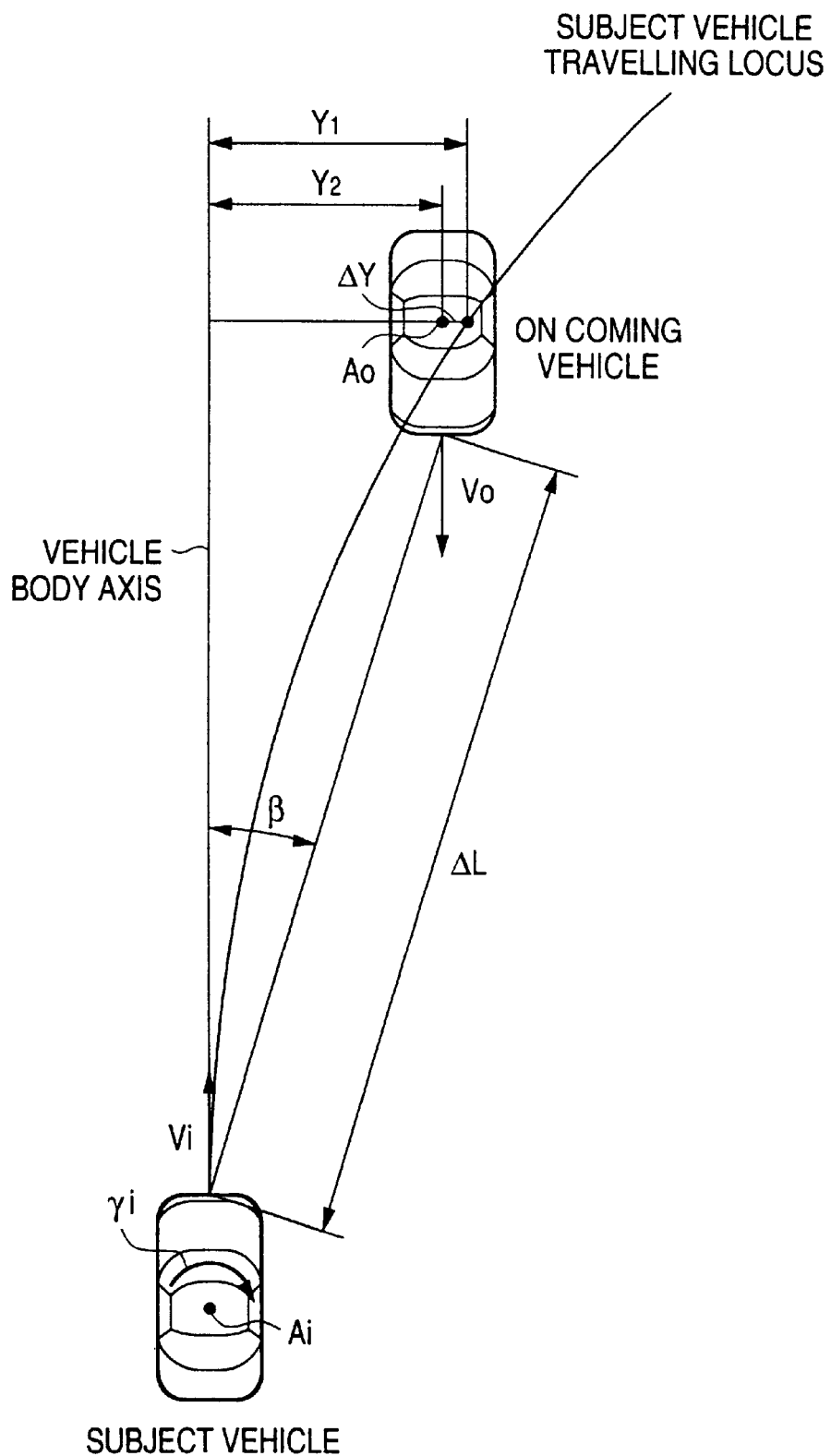
FIG. 3 is a drawing showing a relative relationship between a subject vehicle Ai and an oncoming vehicle Ao.

The radar 3 transmits electromagnetic waves toward left and right predetermined ranges in front of the subject vehicle and receives reflected waves resulting when electromagnetic waves so transmitted are reflected off an object. The radar information processor 4 constituting an object detection unit of the present invention calculates based on signals from the radar 3 a relative position relationship between the subject vehicle Ai and the oncoming vehicle Ao. As shown in FIG. 3, the relative positional relationship between the subject vehicle Ai and the oncoming vehicle Ao is constituted by a relative distance ΔL between the subject vehicle Ai and the oncoming vehicle Ao, a relative velocity ΔV between the subject vehicle Ai and the oncoming vehicle Ao(in other words, a difference between the vehicle velocity Vi of the subject vehicle Ai and the vehicle velocity Vo of the oncoming vehicle Ao), and a relative transverse distance $Y_2$ of the oncoming vehicle Ao relative to the vehicle axis of the subject vehicle Ai. The relative transverse distance $Y_2$ can be calculated based on an angle β formed by the oncoming vehicle Ao relative to the vehicle body axis of the subject vehicle Ai and the relative distance ΔL between the subject vehicle Ai and the oncoming vehicle Ao. The radar 3 can detect a preceding vehicle and a stationary object on the road as well as the oncoming vehicle Ao, and moreover it can also identify the oncoming vehicle Ao from a preceding vehicle and a stationary object based on the magnitude of the relative velocity ΔV. In addition, in this embodiment, a millimetric wave is used which can detect the aforesaid relative relationships (ΔL, ΔV, β) between the subject vehicle Ai and the oncoming vehicle Ao through a single transmitting and receiving operation.

The image processor 6 detects a center line of the road based on an image in front of the subject vehicle imaged by the camera 5 constituting an imaging unit according to the present invention and judges on an exit portion (a transition portion from a curved path to a straight path) of a curve or bend from the degree of curvature of the center line so detected.

Figure 4:
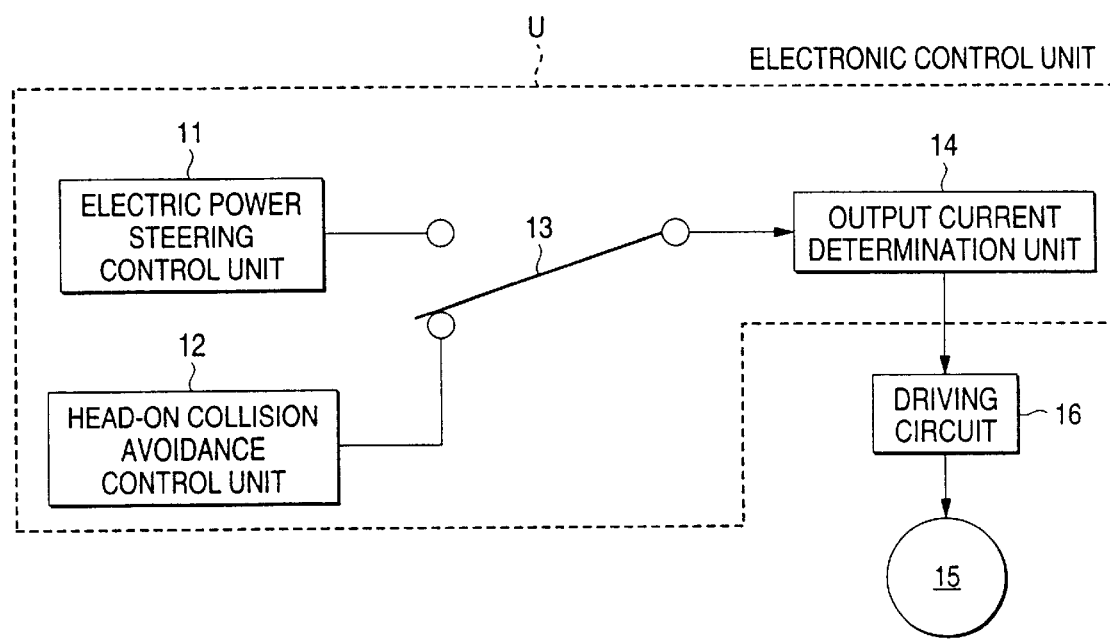
FIG. 4 is an explanatory drawing explaining a function of an electronic control unit.

As shown in FIG. 4, the electronic control unit U includes an electric power steering control unit 11, a head-on collision avoidance control unit 12, a switching unit 13 and an output current determination unit 14. In normal times, the switching unit 13 is connected to the side of the electric power steering control unit 11, and the electric power steering device 2 performs a normal power steering function. In other words, the output current determination unit 14 determines an output current that is to be output to an actuator 15 in response to a steering torque input into the steering wheel 1 and the vehicle velocity, and outputs this output current so determined to the actuator 15 via a driving circuit 16 to thereby assist the driver in operating the steering wheel 1. On the other hand, in a case where there is a possible head-on collision of the subject vehicle Ai with the oncoming vehicle Ao, the switching unit 13 is then connected to the side of the head-on collision avoidance control unit 12 to thereby control the driving of the actuator 15 with the head-on collision avoidance control unit 12, thus effecting automatic steering for avoiding a head-on collision with the oncoming vehicle Ao. The details of this automatic steering will be described at a latter part.

Figure 5:
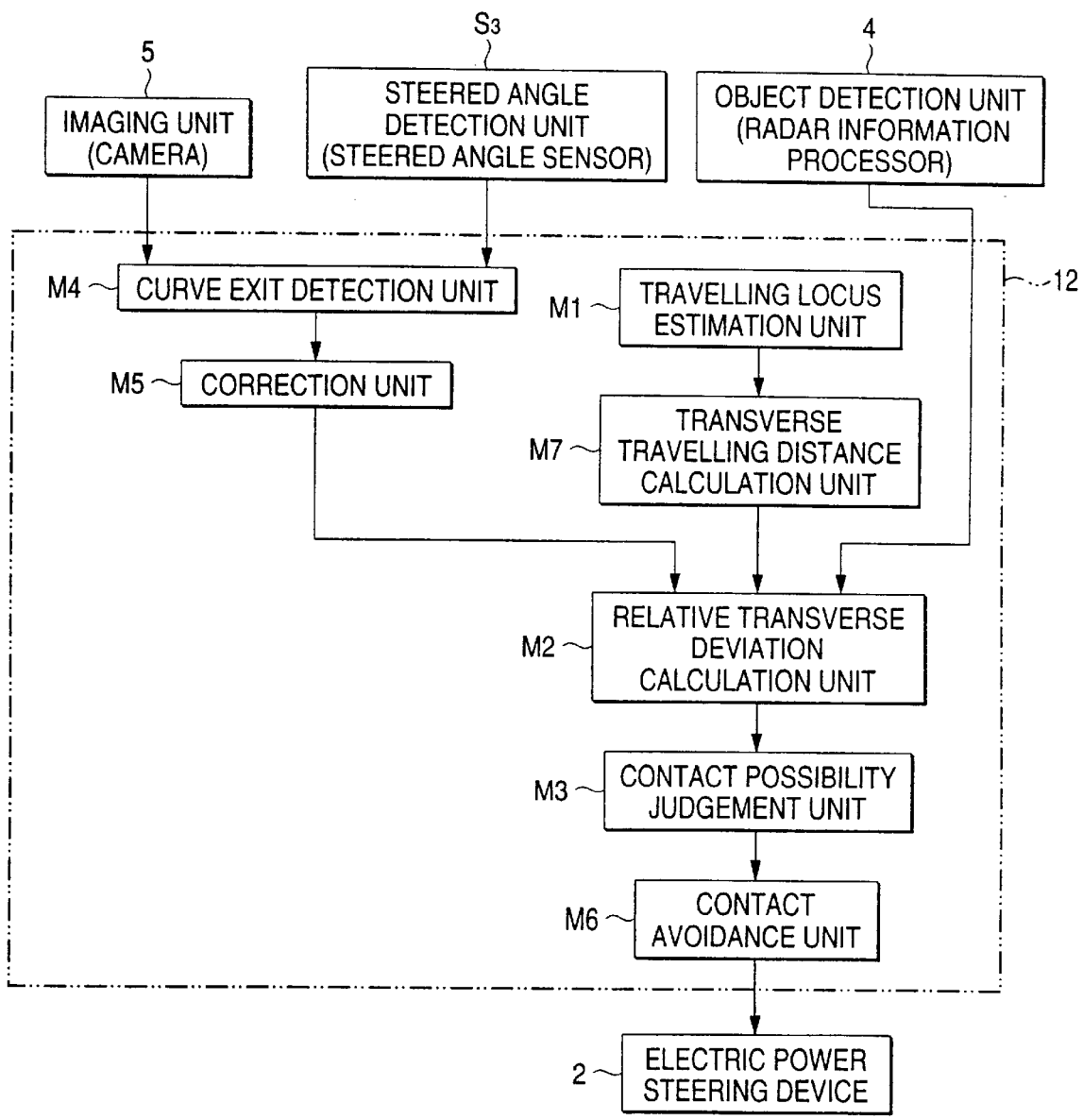
FIG. 5 is a block diagram describing a circuit for a head-on collision avoidance control unit according to the first embodiment.

As shown in FIG. 5, provided in the interior of the head-on collision avoidance control unit 12 of the electronic control unit U are a travelling locus estimation unit M1, a relative transverse deviation calculation unit M2, a contact possibility judgment unit M3, a curve exit detection unit M4, a correction unit M5, a contact avoidance unit M6 and a transverse travelling distance calculation unit M7.

The travelling locus estimation unit M1 estimates a future travelling locus of the subject vehicle Ai based on the vehicle velocity Vi and yaw rate γi of the subject vehicle Ai. The transverse travelling distance calculation unit M7 calculates a future transverse travelling distance $Y_1$ of the subject vehicle Ai based on the travelling locus estimated by the travelling locus estimation unit M1. The relative transverse deviation calculation unit M2 calculates a relative transverse deviation ΔY between the subject vehicle Ai and the oncoming vehicle Ao based on the future travelling locus (i.e., the transverse travelling distance $Y_1$) of the subject vehicle Ai and the relative distance ΔL, relative velocity ΔV and angle β between the subject vehicle Ai and the oncoming vehicle Ao that are detected by the object detection unit 4 (radar information processor 4).

The contact possibility judgment unit M3 judges that there is a possible collision of the subject vehicle Ai with the oncoming vehicle Ao when the relative transverse deviation ΔY resides in a state −ε≦Δ≦ε. At this moment, when the curve exit detection unit M4 judges that the subject vehicle Ai is at an exit of a rightward curve (in the case of left-hand side traffic) or an exit of a leftward curve (in the case of right-hand side traffic) based on outputs from the imaging unit 5 (camera 5) or the steered angle detection unit $S_3$ (steered angle sensor $S_3$), the correction unit M5 corrects the relative transverse deviation ΔY between the subject vehicle Ai and the oncoming vehicle Ao. Then, the contact avoidance unit M6 effects contact avoidance steering via the electric power steering device 2 so as to avoid a contact of the subject vehicle Ai with the oncoming vehicle Ao based on the relative transverse deviation ΔY after correction.

Next, referring to a flowchart shown in FIG. 6, an operation of the first embodiment of the present invention will be described.

Figure 6:
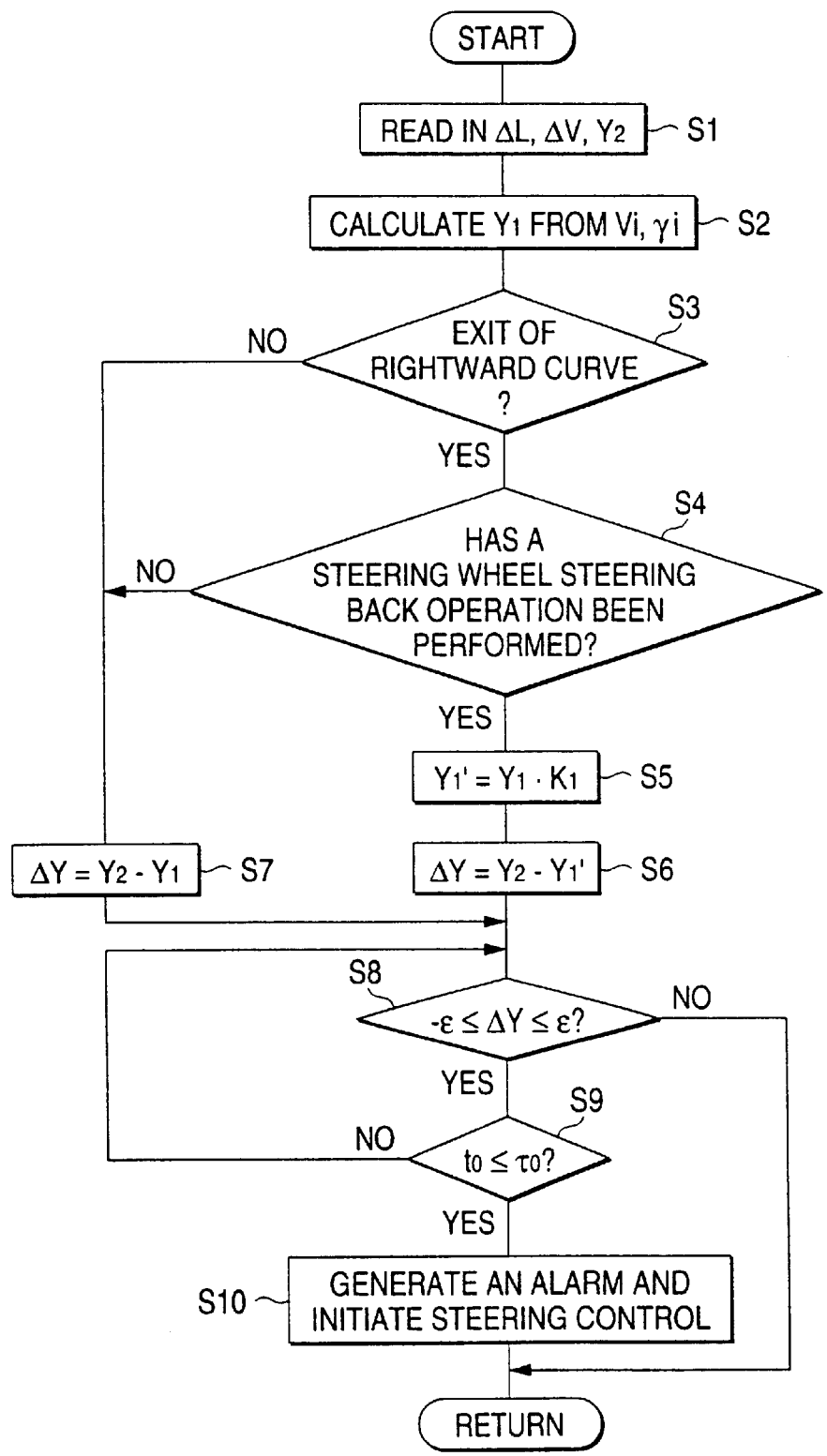
FIG. 6 is a flowchart of a collision avoidance control routine according to the first embodiment.

First of all, at Step S1 on the flowchart in FIG. 6, read in the electronic control unit U from the radar information processor 4 are the relative distance ΔL between the subject vehicle Ai and the oncoming vehicle Ao, the relative velocity ΔV between the subject vehicle Ai and the oncoming vehicle Ao, and the relative transverse distance $Y_2$ of the oncoming vehicle Ao relative to the vehicle body axis of the subject vehicle Ai. At the following Step S2, a transverse travelling distance $Y_1$ is calculated based on the vehicle velocity Vi of the subject vehicle Ai detected by the vehicle velocity sensors $S_1$ . . . and the yaw rate γi of the subject vehicle Ai detected by the yaw rate sensor $S_2$. As shown in FIG. 3, the transverse travelling distance $Y_1$ is a transverse distance produced when the subject vehicle Ai travels to the current position of the oncoming vehicle Ao and is calculated as follows. In other words, since a time $t_1$ taken before the subject vehicle Ai reaches the current position of the oncoming vehicle Ao is given by dividing the relative distance ΔL by the vehicle velocity Vi of the subject vehicle Ai, ΔL/Vi, a transverse travelling distance $Y_1$ of the subject vehicle Ai after the elapse of time $t_1$=ΔL/Vi is obtained by using the vehicle velocity Vi and yaw rate γi of the subject vehicle Ai as follows;

$$Y_1 = (\tfrac{1}{2}) \cdot Vi \cdot \gamma i \cdot (\Delta L/Vi)^2 \qquad (1)$$

At the following Step S3, whether or not the subject vehicle Ai is approaching an exit of a rightward curve on a left-hand side traffic road is judged based on the degree of curvature of the center line detected by the image processor 6. If an answer to Step S3 is YES and it is judged once that the subject vehicle Ai is approaching the exit of the rightward curve of the left-hand side traffic road, at Step S4, whether or not there has been a steering wheel 1 steering back operation by the driver is judged based on a steered angle θ detected by the steered angle sensor $S_3$. In other words, let a steering velocity dθ/dt when the steering wheel 1 is steered rightward a positive value, if the steering velocity dθ/dt is a negative value, this confirms that the steering wheel 1 is steered back leftward by the driver at the exit portion of the rightward curve.

Thus, in a case where either of answers to Steps S3 and S4 is NO, it is finally judged that the subject vehicle Ai has not approached yet the exit of the rightward curve, and then move to Step S7. At Step S7, a relative transverse deviation $\Delta Y$ is calculated by subtracting the transverse travelling distance $Y_1$ from the relative transverse travelling distance $Y_2$.

$$\Delta Y = Y_2 - Y_1 \quad (2)$$

As is clear from FIG. 3, the relative transverse deviation $\Delta Y$ corresponds to a transverse deviation resulting between the current position of the oncoming vehicle Ao and an estimated position of the subject vehicle Ai when the subject vehicle travels to the current position of the oncoming vehicle Ao. The relative transverse deviation $\Delta Y$ has a positive or negative value, and in the case of the left-hand side traffic described in this embodiment, if the relative transverse deviation $\Delta Y$ has a positive value because of $Y_2 > Y_1$, the estimated travelling locus of the subject vehicle Ai passes on the left-hand side of the current position of the oncoming vehicle Ao. On the other hand, if the relative transverse deviation $\Delta Y$ has a negative value because of $Y_2 < Y_1$, the estimated travelling locus of the subject vehicle Ai passes on the right-hand side of the current position of the oncoming vehicle Ao. In addition, as the absolute value of the relative transverse deviation becomes smaller, the possibility of a contact of the subject vehicle Ai with the oncoming vehicle Ao becomes higher.

At the following Step S8, whether or not the relative transverse deviation $\Delta Y$ resides within a preset range is judged. In other words, if the relative transverse deviation $\Delta Y$ resides within a predetermined range based on a predetermined value $\epsilon$ preset in turn based on the width of the vehicle body of the vehicle (for instance, 2 m), and $$-\epsilon \leq \Delta \leq \epsilon \quad (3)$$

is obtained, it is judged that there is a possible collision of the subject vehicle Ai with the oncoming vehicle Ao. On the other hand, if the above equation is not obtained, it is judged that the subject vehicle Ai passes through on the left-hand side or right-hand side of the oncoming vehicle Ao, causing no collision, and return to Step S1 without performing automatic steering for avoiding a collision.

At the following Step S9, with a view to determining a timing when a collision avoidance control is initiated, a time $t_0$ taken before the subject vehicle Ai reaches a collision predicted point is calculated, and the time $t_0$ so calculated is then compared with a preset threshold value $\tau_0$. The time $t_0$ taken before the subject vehicle Ai reaches a collision predicted point is calculated by dividing the relative distance $\Delta L$ by the relative velocity $\Delta V$ of the subject vehicle Ai and the oncoming vehicle Ao.

$$t_0 = \Delta L / \Delta V \quad (4)$$

In addition, the aforesaid threshold value $\tau_0$ corresponds to a timing when the driver initiates a voluntary collision avoidance steering and can be obtained in an experimental fashion. Thus, when to becomes equal to or less than $\tau_0$ at Step S9, then at Step S10, the indicator 7 and the alarm 8 are activated so as to generate an alarm to the driver and automatic steering is performed for avoiding a collision.

On the other hand, where both answers to Steps S3 and S4 are YES, it is finally judged that the subject vehicle Ai is approaching the exit of the rightward curve, and then at the following Step S5, what results by multiplying the transverse travelling distance $Y_1$ by the correction coefficient $K_1$ is designated as a corrected transverse travelling distance $Y_1'$.

$$Y_1' = Y_1 \cdot K_1 \quad (5)$$

Figure 7:
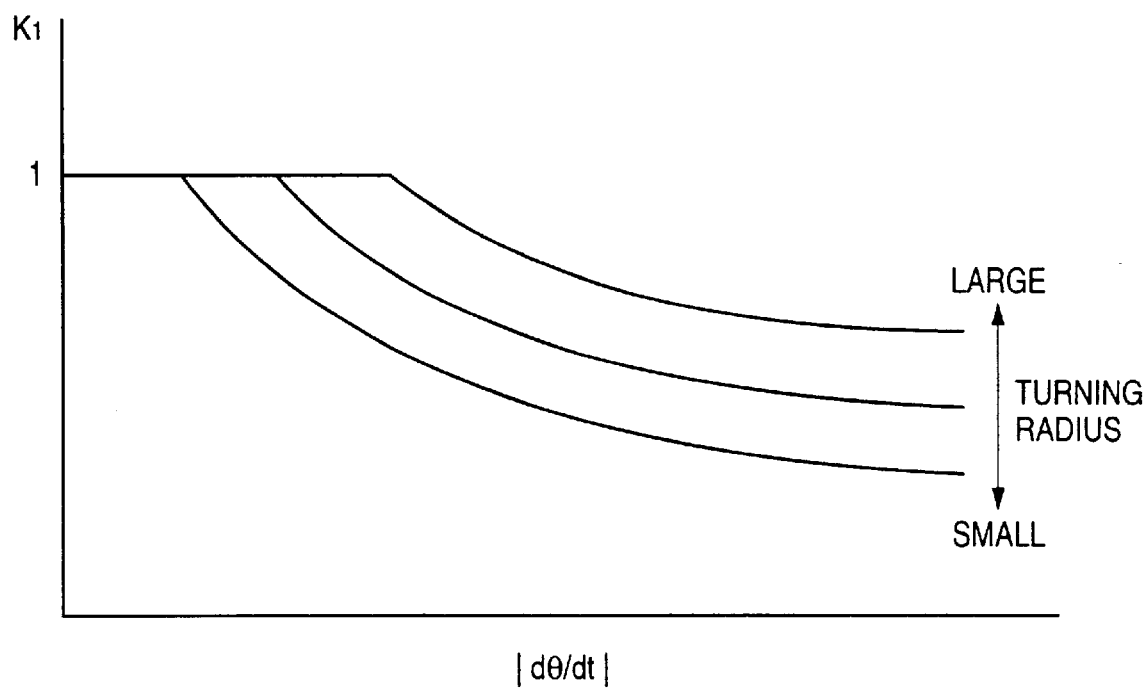
FIG. 7 is a map for retrieving a correction coefficient K1 from a steering speed $d\theta/dt$ and a turning radius R according to the first embodiment.

A map shown in FIG. 7 is used to retrieve the correction coefficient $K_1$ based on a turning radius R of the subject vehicle Ai at the curve and the absolute value $|d\theta/dt|$ of the steering speed. The turning radius R is calculated from the configuration of the center line detected by the image processor 6. As is clear from this map, the correction coefficient $K_1$ becomes smaller as the turning radius R becomes smaller or the absolute value $|d\theta/dt|$ of the steering speed becomes greater, and in response to this, the corrected transverse travelling distance $Y_1'$ also becomes smaller.

Figure 8:
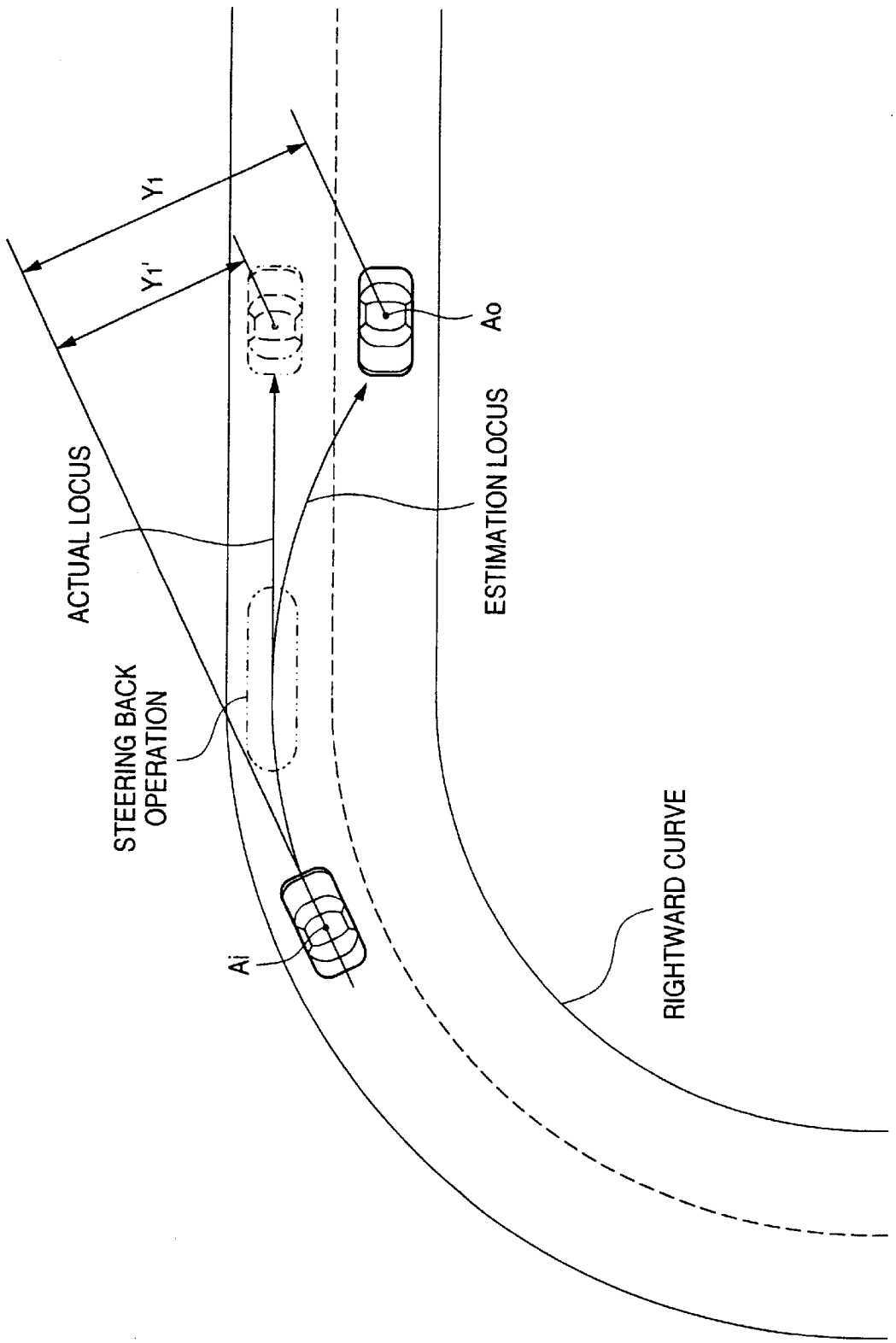
FIG. 8 is a drawing explaining a transverse travelling distance Y1 and a corrected transverse travelling distance Y1' at an exit of a curve.

FIG. 8 shows a state in which the subject vehicle Ai is approaching the exit of the rightward curve, and the transverse travelling distance $Y_1$ is one estimated based on the current vehicle velocity Vi and yaw rate $\gamma i$. However, since the driver steers the steering wheel 1 leftward at a transition part of the road from a curved path to a straight path, the transverse travelling distance actually produced becomes smaller the aforesaid transverse travelling distance $Y_1$. In other words, the corrected transverse distance $Y_1'$ corrected so as to be reduced by multiplying the transverse travelling distance $Y_1$ by the correction coefficient $K_1$, which is equal to or less than 1 approximates an actual transverse travelling distance that is actually produced where the road transitions from a curved path to a straight path.

Thus, at Step S6, a corrected transverse deviation $\Delta Y$ is calculated by subtracting the corrected transverse travelling distance $Y_1'$ from the relative transverse travelling distance $Y_2$.

$$\Delta Y = Y_2 - Y_1' \quad (6)$$

Then, at Step S8, a judgment on a collision possibility is made based on the equation (3), whereby an accurate judgment can be made even at the exit of the curve.

Further, although the relative transverse deviation $\Delta Y$ is corrected by correcting the transverse travelling distance $Y_1$ in the above embodiment, it is possible to correct relative transverse deviation $\Delta Y$ by correcting the future travelling locus of the subject vehicle Ai by the radius R of the curve or the absolute value $|d\theta/dt|$ of the steering speed.

[Second Embodiment]

A second embodiment of the present invention, which prevents the occurrence of a collision avoidance operation based on an erroneous judgment of a possible collision between the subject vehicle and an oncoming vehicle when the driver of the subject vehicle tries to overtake a preceding vehicle will be described with reference to FIGS. 3, 4 and 9–14. Portions represented by the same reference numeral as the first embodiment are identical to those of the first embodiment, and the descriptions of them are omitted.

Figure 9:
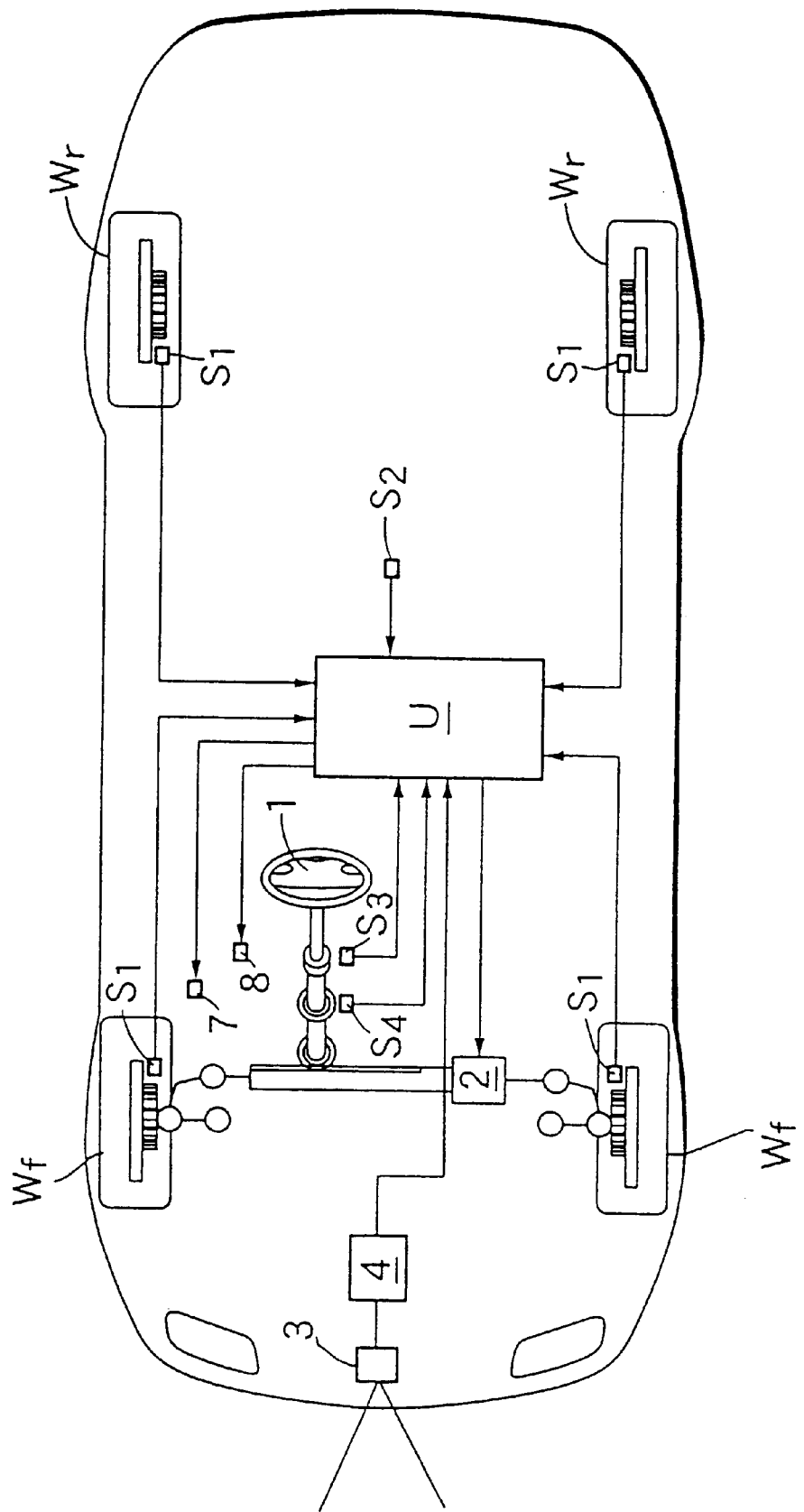
FIG. 9 is an overall structural view of a vehicle provided with a safety running system according to a second embodiment of the present invention.
Figure 10:
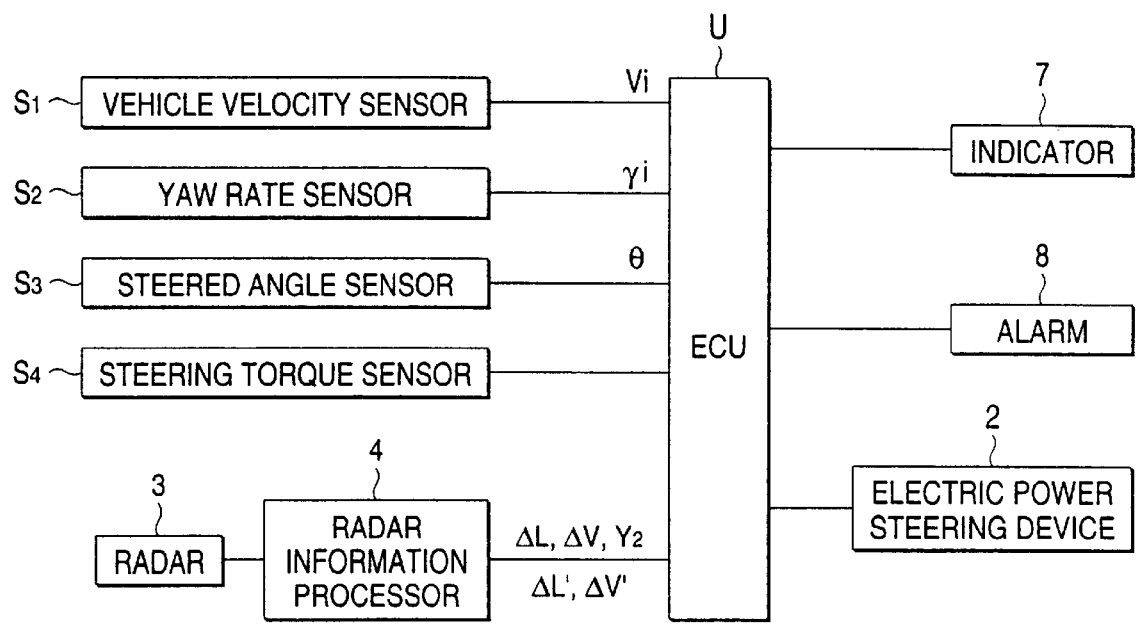
FIG. 10 is a block diagram of the safety running system according to the second embodiment.
Figure 11:
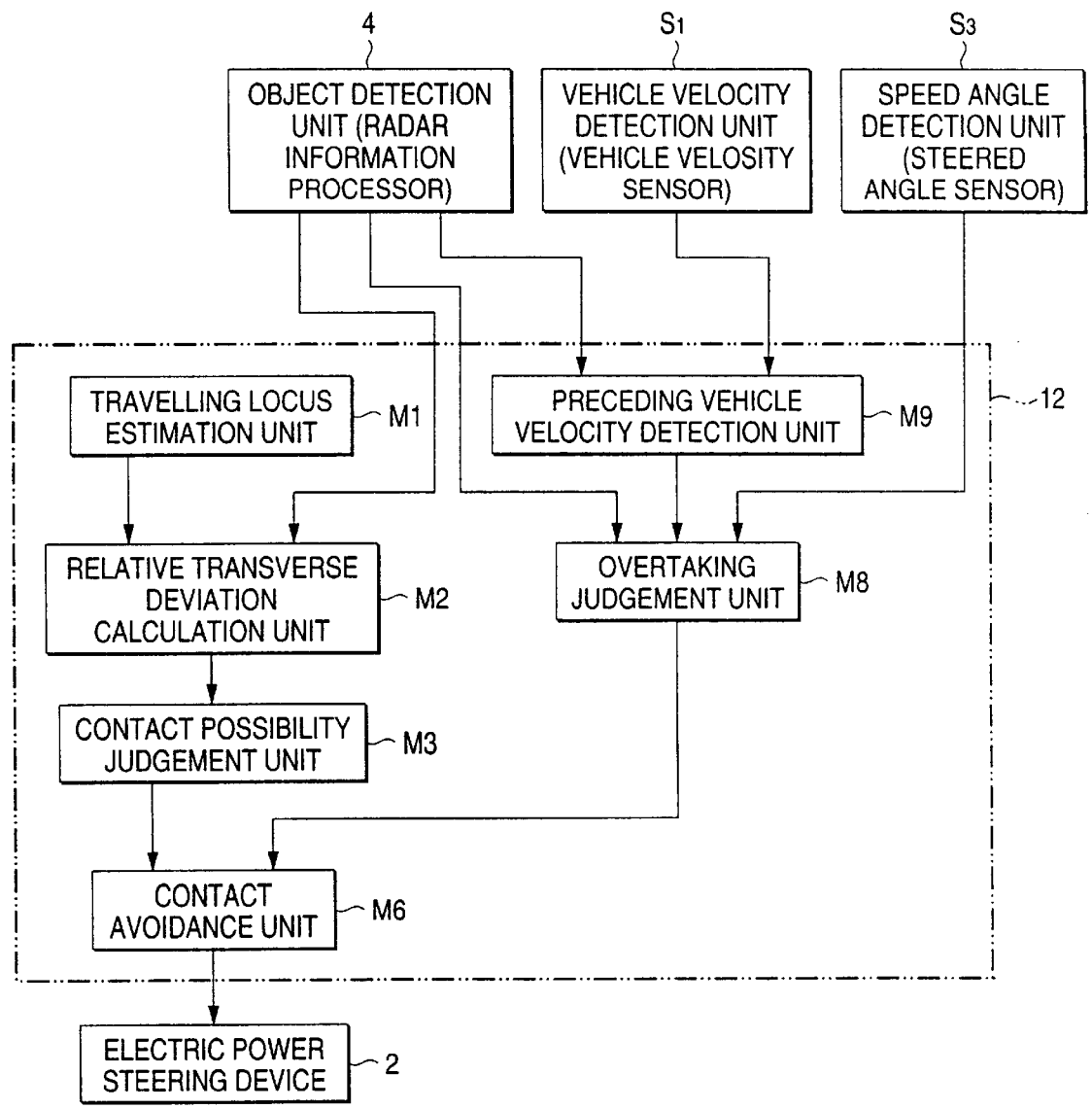
FIG. 11 is a block diagram describing a circuit of a head-on collision avoidance control unit according to the second embodiment.

FIGS. 9 and 10 show an overall structural view of a vehicle provided with a safety running system of the second embodiment of the present invention, and a block diagram of the safety running, respectively. The vehicle shown in FIGS. 9 and 10 has the same equipment as that of the first embodiment except for the camera 5 and the image processor 6. Of course, the vehicle shown in FIGS. 1 and 2 can be applied to the second embodiment.

In addition, the electronic control unit U includes an electric power steering control unit 11, a head-on collision avoidance control unit 12, a switching unit 13 and an output current determination unit 14 as well as that of the first embodiment shown in FIG. 4. In normal times, the switching unit 13 is connected to the side of the electric power steering control unit 11, and the electric power steering device 2 performs a normal power steering function. In other words, the output current determination unit 14 determines an output current that is to be output to an actuator 15 in response to a steering torque input into the steering wheel 1 and the vehicle velocity, and outputs this output current so determined to the actuator 15 via a driving circuit 16 to thereby assist the driver in operating the steering wheel 1. On the other hand, in a case where there is a possible head-on collision of the subject vehicle Ai with the oncoming vehicle Ao, the switching unit 13 is then connected to the side of the head-on collision avoidance control unit 12 to thereby control the driving of the actuator 15 with the head-on collision avoidance control unit 12, thus effecting automatic steering for avoiding a head-on collision with the oncoming vehicle Ao. The details of this automatic steering will be described at a latter part.

As shown in FIG. 5, provided in the interior of the head-on collision avoidance control unit 12 of the electronic control unit U are a travelling locus estimation unit M1, a relative transverse deviation calculation unit M2, a contact possibility judgment unit M3, a contact avoidance unit M6, an overtaking judgment unit M8 and a preceding vehicle's velocity detection unit M9.

The travelling locus estimation unit M1 estimates a future travelling locus of the subject vehicle Ai based on the vehicle velocity Vi and yaw rate γi of the subject vehicle Ai. The relative transverse deviation calculation unit M2 calculates a relative transverse deviation $\Delta Y$ between the subject vehicle Ai and the oncoming vehicle Ao based on the future travelling locus (i.e., the transverse travelling distance $Y_1$) of the subject vehicle Ai and the relative distance $\Delta L$, relative velocity $\Delta V$ and angle β between the subject vehicle Ai and the oncoming vehicle Ao that are detected by the object detection unit 4 (radar information processor 4). The contact possibility judgment unit M3 judges that there is a possible collision of the subject vehicle Ai with the oncoming vehicle Ao when the relative transverse deviation $\Delta Y$ resides in a state $-\epsilon \leq \Delta \leq \epsilon$. A contact avoidance unit M6 performs a contact avoidance operation via an electric power steering device 2 in order to avoid a contact between the subject vehicle Ai and the oncoming vehicle Ao when the contact possibility judgment unit M3 judges that there is a contact possibility therebetween.

When this happens, if the overtaking judgment unit M8 judges that the subject vehicle Ai is in course of overtaking a preceding vehicle Af, the contact avoidance unit M6 restrains a contact avoidance operation or ceases a contact avoidance operation being performed, thereby making it possible to avoid an unnecessary contact avoidance operation based on an erroneous judgment of a contact possibility during overtaking.

The judgment of the initiation of overtaking of a preceding vehicle by the overtaking judgment unit M8 is performed based on the relative velocity $\Delta V'$ of the preceding vehicle Af detected by an object detection unit 4, a relative distance $\Delta L'$ to the preceding vehicle Af detected by the object detection unit 4 and a steered angle θ detected by a steered angle detection unit $S_3$ (a steered angle sensor $S_3$). And, the judgment of the completion of overtaking of the preceding vehicle by the overtaking judgment unit M5 is performed based on a travel distance of the subject vehicle Ai, a travel distance of the preceding vehicle Af and the relative distance $\Delta L'$ to the preceding vehicle Af. In this process, the travel distance of the subject vehicle Ai is calculated based on the vehicle velocity Vi of the subject vehicle Ai detected by vehicle velocity detection unit $S_1$ (vehicle velocity sensors $S_1$). The travel distance of the preceding vehicle Af is calculated based on the vehicle velocity Vf of the preceding vehicle Af calculated by a preceding vehicle's vehicle velocity calculating unit M6 from the relative velocity $\Delta V'$ of the preceding vehicle Af and the vehicle velocity Vi of the subject vehicle Ai.

Next, referring to a flowchart shown in FIGS. 12 and 13, an operation of the second embodiment of the present invention will be described.

Figure 12:
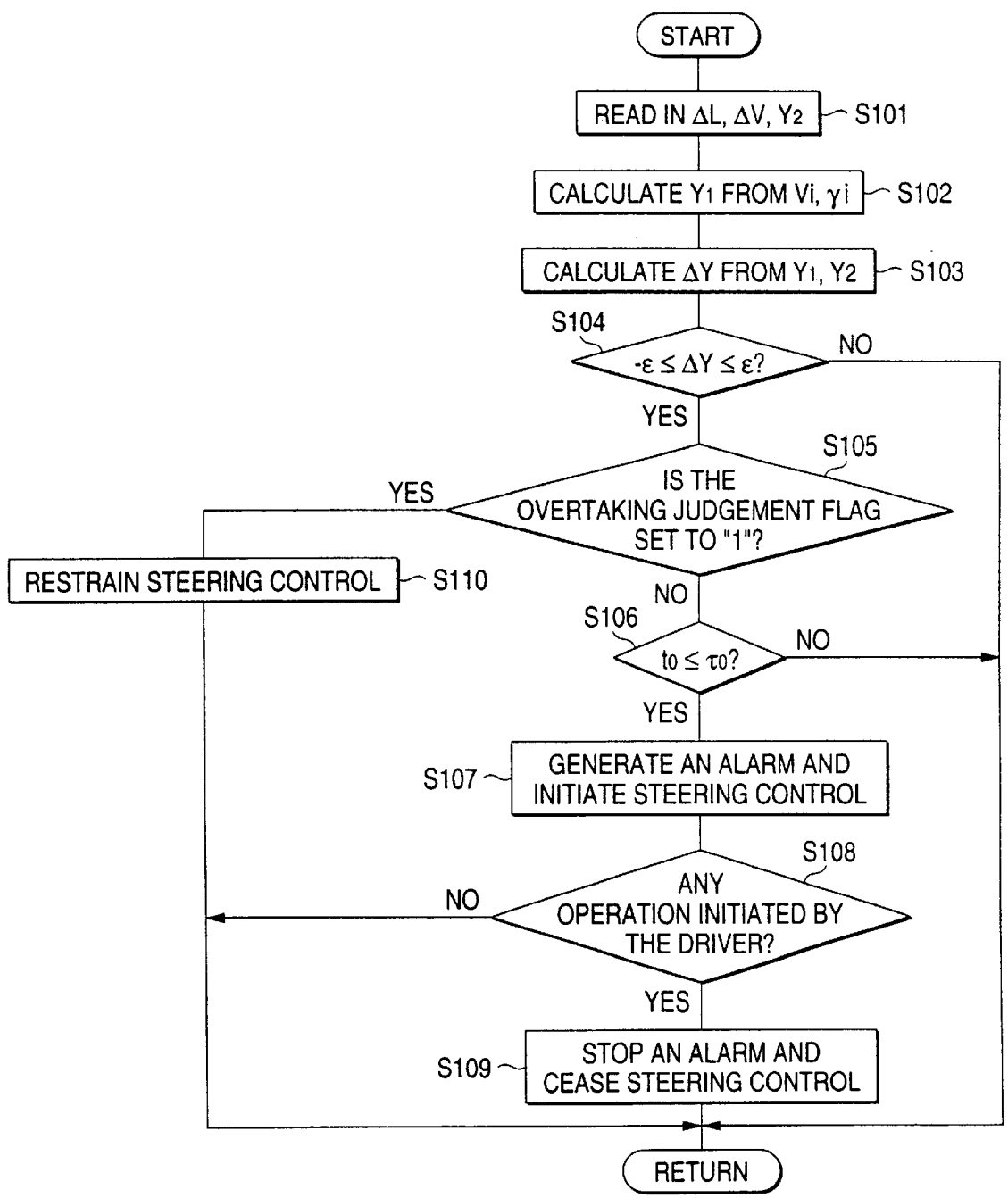
FIG. 12 is a flowchart of a head-on collision avoidance control routine according to the second embodiment.
Figure 13:
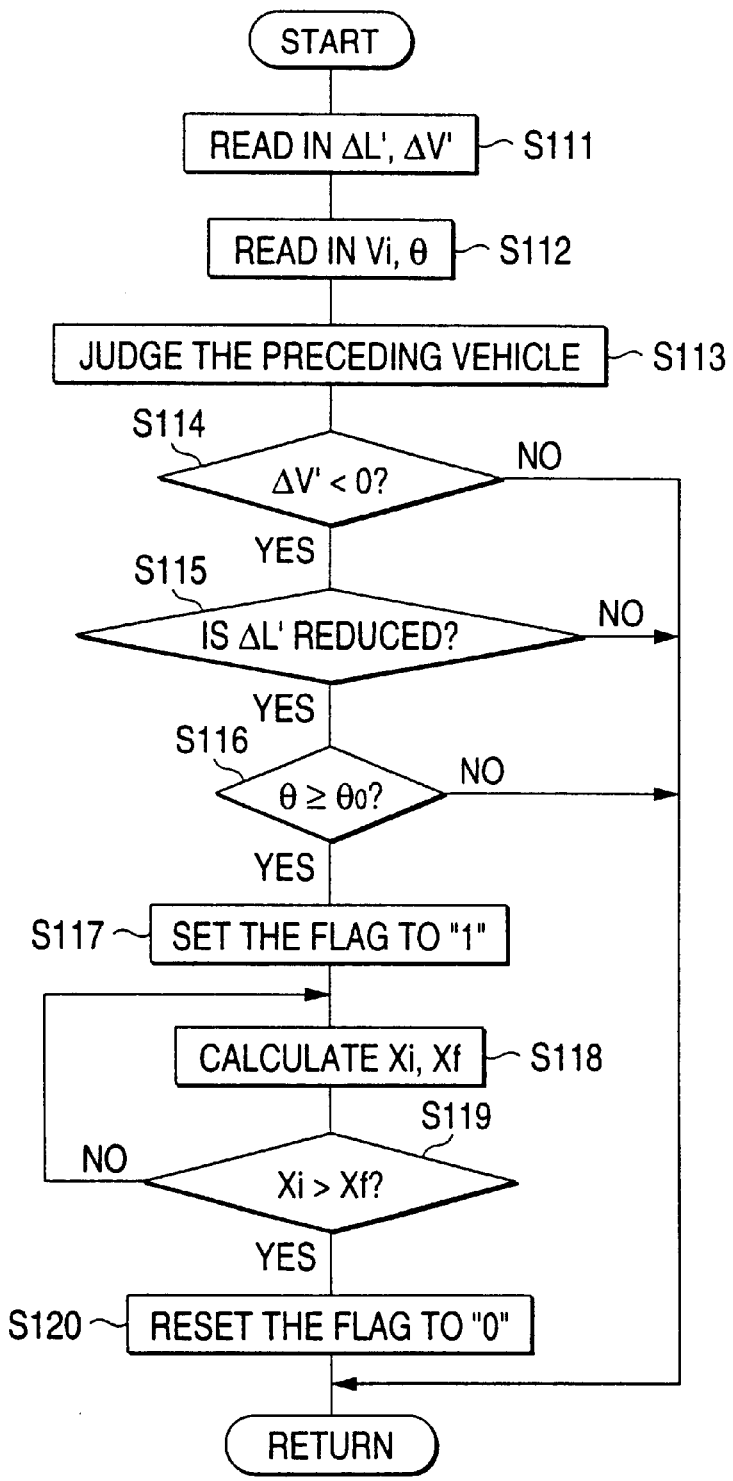
FIG. 13 is a flowchart of flag setting routine according to the second embodiment.
Figure 14:
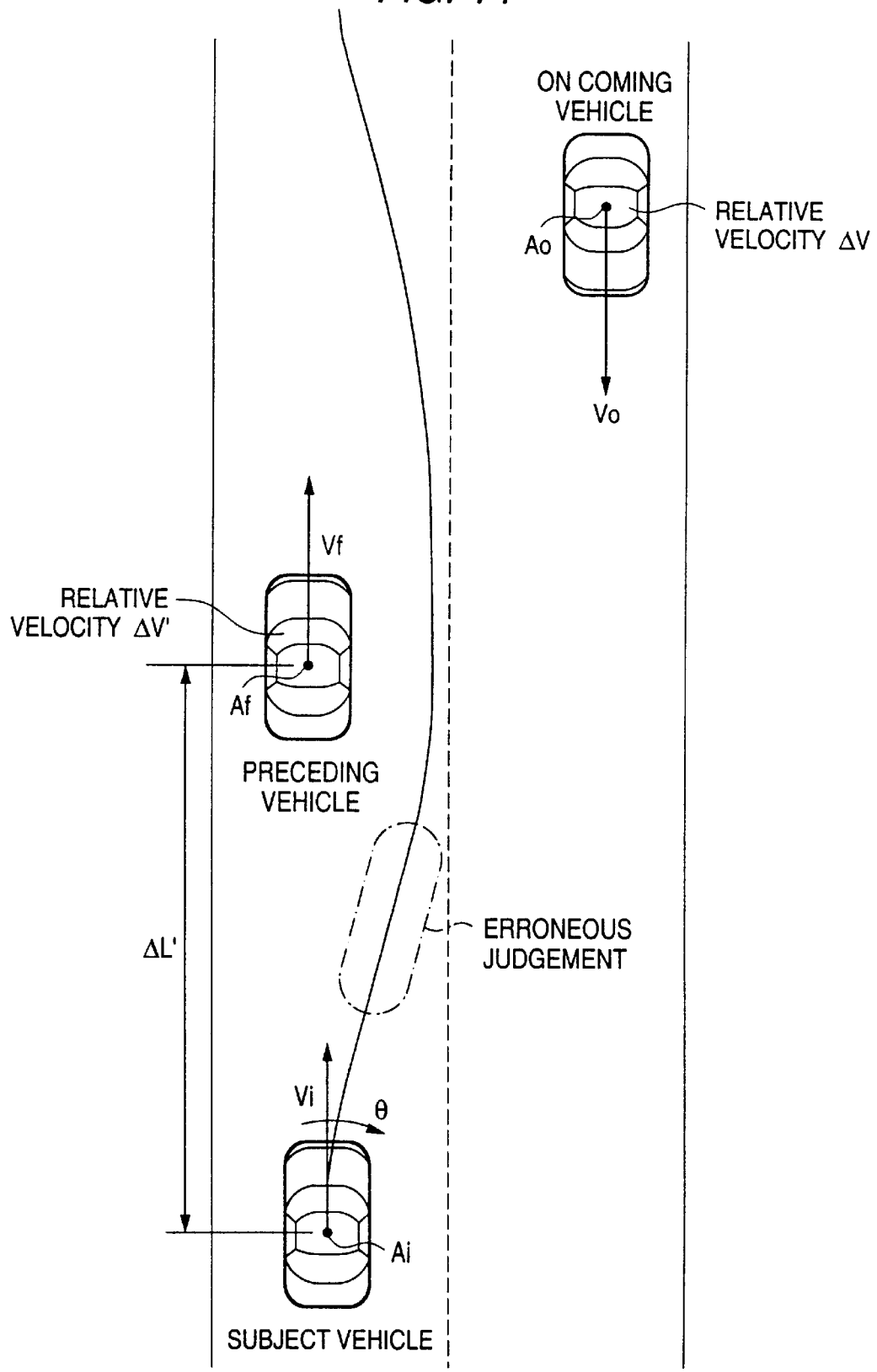
FIG. 14 is a drawing explaining an operation of the safety running system when overtaking a preceding vehicle.

First of all, at Step S101 on the flowchart in FIG. 12, read in the electronic control unit U from the radar information processor 4 are the relative distance $\Delta L$ between the subject vehicle Ai and the oncoming vehicle Ao, the relative velocity $\Delta V$ between the subject vehicle Ai and the oncoming vehicle Ao, and the relative transverse distance $Y_2$ of the oncoming vehicle Ao relative to the vehicle body axis of the subject vehicle Ai. At the following Step S102, a transverse travelling distance $Y_1$ is calculated based on the vehicle velocity Vi of the subject vehicle Ai detected by the vehicle velocity sensors $S_1$ . . . and the yaw rate γi of the subject vehicle Ai detected by the yaw rate sensor $S_2$. As shown in FIG. 3, the transverse travelling distance $Y_1$ is a transverse distance produced when the subject vehicle Ai travels to the current position of the oncoming vehicle Ao and is calculated as follows. In other words, since a time $t_1$ taken before the subject vehicle Ai reaches the current position of the oncoming vehicle Ao is given by dividing the relative distance $\Delta L$ by the vehicle velocity Vi of the subject vehicle Ai, $\Delta L/Vi$, a transverse travelling distance $Y_1$ of the subject vehicle Ai after the elapse of time $t_1 = \Delta L/Vi$ is obtained by using the vehicle velocity Vi and yaw rate γi of the subject vehicle Ai as follows;

$$Y_1 = (½) \cdot Vi \cdot \gamma i \cdot (\Delta L/Vi)^2 \tag{11}$$

At the following Step S103, a relative transverse deviation $\Delta Y$ is calculated by subtracting the transverse travelling distance $Y_1$ from the relative transverse travelling distance $Y_2$.

$$\Delta Y = Y_2 - Y_1 \tag{12}$$

As is clear from FIG. 3, the relative transverse deviation $\Delta Y$ corresponds to a transverse deviation resulting between the current position of the oncoming vehicle Ao and an estimated position of the subject vehicle Ai when the subject vehicle travels to the current position of the oncoming vehicle Ao. The relative transverse deviation $\Delta Y$ has a positive or negative value, and in the case of the left-hand side traffic described in this embodiment, if the relative transverse deviation $\Delta Y$ has a positive value because of $Y_2 > Y_1$, the estimated travelling locus of the subject vehicle Ai passes on the left-hand side of the current position of the oncoming vehicle Ao. On the other hand, if the relative transverse deviation $\Delta Y$ has a negative value because of $Y_2 < Y_1$, the estimated travelling locus of the subject vehicle Ai passes on the right-hand side of the current position of the oncoming vehicle Ao. In addition, as the absolute value of the relative transverse deviation becomes smaller, the possibility of a contact of the subject vehicle Ai with the oncoming vehicle Ao becomes higher.

At the following Step S104, whether or not the relative transverse deviation $\Delta Y$ resides within a preset range is judged. In other words, if the relative transverse deviation $\Delta Y$ resides within a predetermined range based on a predetermined value $\epsilon$ preset in turn based on the width of the vehicle body of the vehicle (for instance, 2 m), and $$-\epsilon \leq \Delta \leq \epsilon \tag{13}$$

is obtained, it is judged that there is a possible collision of the subject vehicle Ai with the oncoming vehicle Ao, which is a first stage judgment. On the other hand, if the above equation is not obtained, it is judged that the subject vehicle Ai passes through on the left-hand side or right-hand side of the oncoming vehicle Ao, causing no collision, and return to Step S101 without performing alarm or steering control for avoiding a collision.

Referred to at Step S105 is the state of an overtaking judgment flag for identifying whether or not the subject vehicle Ai is in course of overtaking the preceding vehicle Af. This overtaking judgment flag is set to "1" when the subject vehicle Ai is overtaking the preceding vehicle Af, while it is set to "0" when no overtaking is judged as occurring. A description thereof will be made below based on the flowchart in FIG. 13.

First of all, at Step S111, the relative distance $\Delta L'$ between an object including the preceding vehicle Af and the subject vehicle Ai is read in from the radar information processor 4, and the relative velocity $\Delta V'$ between the object including the preceding vehicle Af and the subject vehicle Ai is also read in. At the following Step S112, the vehicle velocity Vi of the subject vehicle Ai detected by the vehicle velocity sensors $S_1$ ... and the steered angle $\theta$ of the subject vehicle Ai detected by the steered angle sensor $S_3$ are read in. At the following Step S113, the preceding vehicle Af is identified from an oncoming vehicle Ao based on the relative velocity $\Delta V'$. Since the oncoming vehicle Ao travels in a direction opposite to a travelling direction of the subject vehicle Ai, the absolute value of the relative velocity $\Delta V'$ increases. On the other hand, since the preceding vehicle Af travels in the same direction as that in which the subject vehicle Ai travels, the absolute value of the relative velocity $\Delta V'$ decreases. Thus, an object exhibiting the absolute value of the relative velocity $\Delta V'$ which is equal to or less than a predetermined value can be judged as the preceding vehicle from the above fact. In addition, when the vehicle velocity Vi of the subject vehicle Ai is greater than the vehicle velocity Vf of the preceding vehicle Af, the relative velocity $\Delta V'$ becomes a negative value, while when the vehicle velocity Vi of the subject vehicle Ai is smaller than the vehicle velocity Vf of the preceding vehicle Af, the relative velocity $\Delta V'$ becomes a positive value.

At the following Step S114, if the relative velocity $\Delta V'$ between the subject vehicle Ai and the preceding vehicle Af is not a negative value, in other words, when the vehicle velocity Vi of the subject vehicle Ai is smaller than the vehicle velocity Vf of the preceding vehicle Af, the subject vehicle Ai is judged not to be in an overtaking state, and at Step S120, the overtaking judgment flag is reset to "0". In addition, at Step S115, the change in relative distance $\Delta L'$ between the subject vehicle Ai and the preceding vehicle Af is monitored, and if the relative distance $\Delta L'$ is not reduced, the subject vehicle Ai is judged not to be in an overtaking state, and at Step 20, the overtaking judgment flag is reset to "0". Furthermore, at Step S116, the steered angle sensor $S_3$ compares the steered angle $\theta$ with a threshold value $\theta_0$. If $\theta \geq \theta_0$ is not obtained, the subject vehicle Ai is judged not to be in an overtaking state, and at Step 120, the overtaking judgment flag is reset to "0".

On the other hand, if $\Delta V'<0$ is obtained and the vehicle velocity Vi of the subject vehicle Ai is greater than the vehicle velocity Vf of the preceding vehicle Af at Step S114, if the relative distance $\Delta L'$ between the subject vehicle Ai and the preceding vehicle Af is reduced at Step S115 and if $\theta \geq \theta_0$ is obtained and a steering wheel 1 is largely steered at Step S116, the subject vehicle Ai is judged to have entered an overtaking state, and the overtaking judgment flag is set to "1" at Step 117.

At the following Step S18, running positions Xi, Xf of the subject vehicle Ai and preceding vehicle Af respectively are calculated by referencing the position of the subject vehicle Ai when overtaking is initiated. The running position Xi of the subject vehicle Ai is calculated by integrating the vehicle velocity of the subject vehicle Ai by time and can be obtained with the following equation.

$$Xi = \int Vi \, dt \qquad (14)$$

In addition, the running position Xf of the preceding vehicle Af can be obtained with the following equation by using the relative distance $\Delta L'$ and elapsed time t from the initiation of overtaking on the assumption that the preceding vehicle Af holds the vehicle velocity Vf when overtaking is initiated.

$$Xf = \Delta L' + Vf \cdot t \qquad (15)$$

At the following Step S119, the running position Xi of the subject vehicle Ai and the running position Xf of the preceding vehicle Af are compared with each other, and if Xi $\leq$ Xf, it is judged that the subject vehicle Ai is still located to the rear of the preceding vehicle Af and that it is still in course of overtaking the preceding vehicle Af, while Xi>Xf, it is judged that the subject vehicle Ai runs in front of the preceding vehicle Af and that the overtaking is completed. Then, when the overtaking is judged to have been completed, the overtaking judgment flag is reset to "0" at Step S120.

Returning to the flowchart in FIG. 12, in a case where the overtaking judgment flag is reset to "0" at Step S105 with the subject vehicle Ai being not in course of overtaking the preceding vehicle Af, at Step S106, a time $t_0$ needed until the subject vehicle Ai reaches a predicted collision point with a view to determining an initiation timing of collision avoidance control, and this time $t_0$ is compared with a preset threshold value $\tau_0$. The time $t_0$ needed until the subject vehicle Ai reaches the predicted collision point can be calculated by dividing the relative distance $\Delta L$ between the subject vehicle Ai and the oncoming vehicle Ao by the relative velocity $\Delta V$ therebetween as follows.

$$t_0 = \Delta L / \Delta V \qquad (16)$$

Furthermore, the threshold value $\tau_0$ corresponds to a timing when the driver initiates a voluntary collision avoidance control and is obtained experimentally. Thus, when $t_0$ becomes equal to or less than $\tau_0$ at Step S106, at Step S107 not only are an indicator 7 and a warning device 8 activated so as to generate an alarm to the driver but also automatic steering is performed so as to avoid a collision.

When a voluntary collision avoidance operation by the driver is detected at Step S108 while automatic steering is being performed for avoidance of a collision, in other words, when it is detected through a steering torque sensor that the driver steers the steering wheel 1 or it is detected through a brake pedal step-down force sensor that the driver applies the vehicle brakes, the generation of an alarm and automatic steering for avoidance of a collision are ceased at Step S109. This prevents the voluntary collision avoidance operation by the driver from interfering with the automatic steering and priority is given to the collision avoidance operation by the driver, thereby making it possible to eliminate a feeling of physical disorder that would otherwise be felt by the driver.

On the other hand, in a case where the overtaking judgment flag is reset to "1" at Step S105 with the subject vehicle Ai being in course of overtaking the preceding vehicle Af, the steering control for avoiding a collision is restrained at Step S110. The restraining of the steering control is attained for instance by reducing a target steering angle or delaying a timing when steering is initiated. In a case where the timing when steering is initiated is delayed, the value of a threshold value $\tau_0$ for determining a timing when collision avoidance control is initiated only has to be made smaller than a normal value. This prevents an automatic steering for avoiding a collision with an oncoming vehicle Ao from being effected indiscreetly while the driver is overtaking a preceding vehicle based on his/her own will, whereby a feeling of physical disorder can be eliminated which would be otherwise felt by the driver. In addition, in a case where there remains a possible collision with the oncoming vehicle, only an alarm is given to the driver so that the driver's attention to the oncoming vehicle Ao is not neglected.

As has been described heretofore, since the judgment of the initiation of overtaking is made based on the relative positional relationship between the subject vehicle Ai and the preceding vehicle Af and the steered angle θ of the subject vehicle Ai, it is possible to improve the judgment accuracy when compared with a case in which such a judgment is made based only on a steered angle θ. In addition, since the judgment of the completion of overtaking is made based on the running position Xi of the subject vehicle Ai and the running position Xf of the preceding vehicle Af, it is possible to make a judgment of the completion of overtaking without providing a side sensor for detecting the preceding vehicle Af from the side thereof.

For instance, although in the second embodiment the steering control for avoiding a collision is restrained during overtaking, the steering control may be ceased. In addition, although in the embodiment only the case is described in which the preceding vehicle is overtaken, the present invention may be applied similarly to a case in which a collision with a preceding vehicle Af stopped on the road or an obstacle dropped on the road is avoided by steering a subject vehicle clear of the side of the stopped preceding vehicle or the dropped obstacle. Therefore, the preceding vehicle Af of the present invention includes a stopped preceding vehicle or a stationary object on the road as well as a preceding vehicle on the move. In addition, the steered angle θ detected by the steered angle sensor $S_3$ may be substituted by a steered or turned angle of a wheel.

[Third Embodiment]

A third embodiment of the present invention, which prevents the performance of an unnecessary collision avoidance control by making a judgment of a possible collision with an oncoming vehicle in an accurate fashion will be described with reference of FIGS. 3, 4 and 15–23. Portions represented by the same reference numeral as the first embodiment are identical to those of the first embodiment, and the descriptions of them are omitted.

Figure 15:
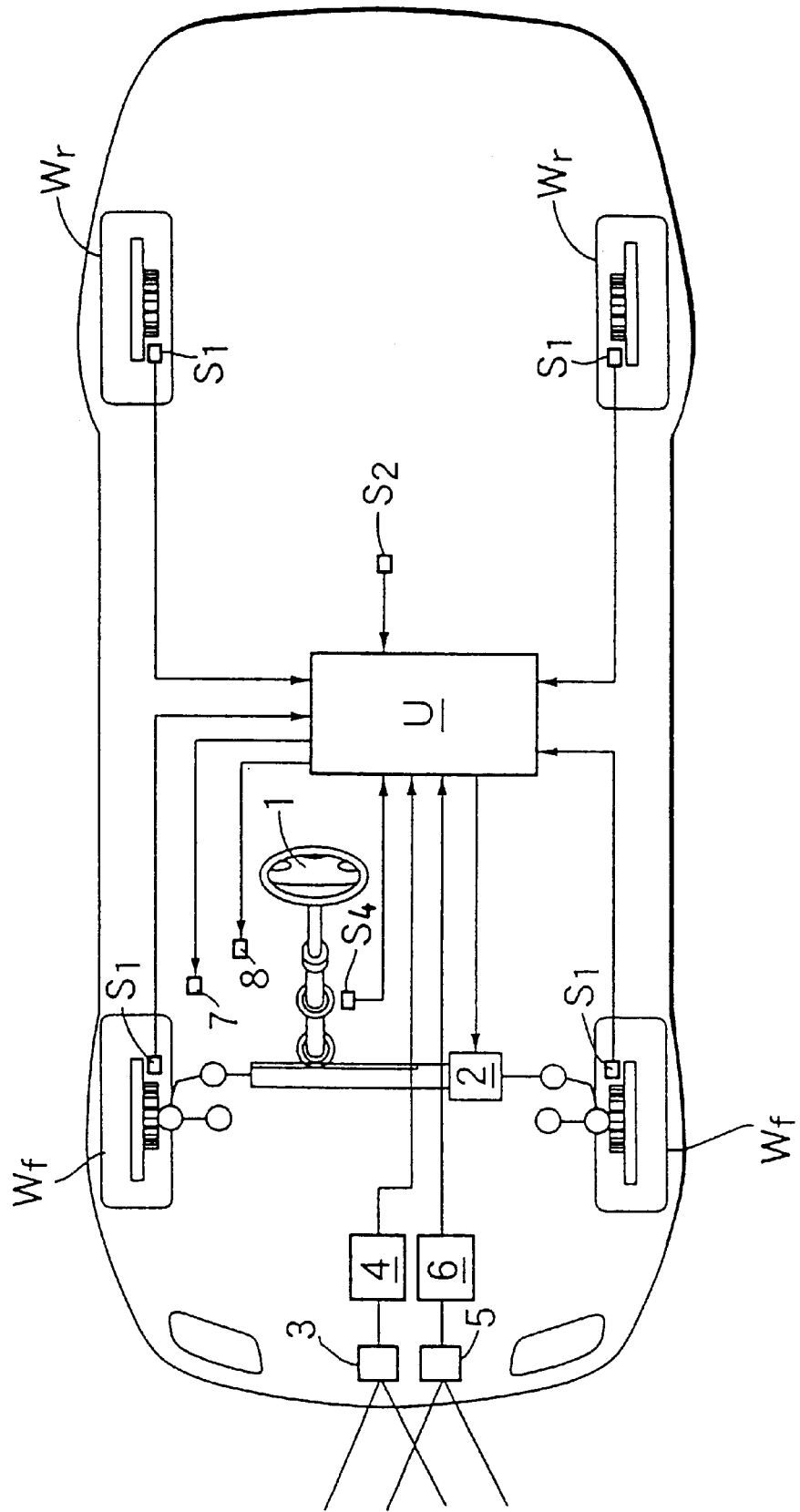
FIG. 15 is an overall structural view of a vehicle provided with a safety running system according to the third embodiment of the present invention.
Figure 16:
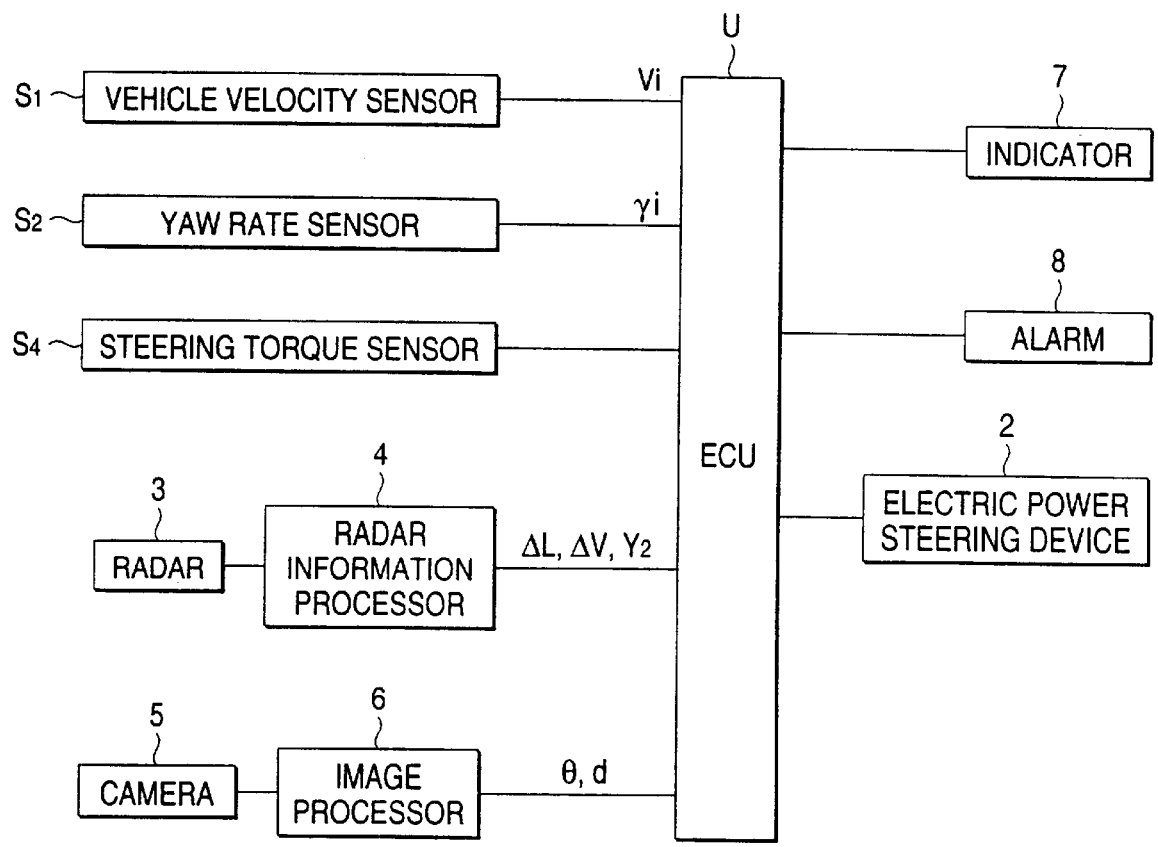
FIG. 16 is a block diagram of the safety running system according to the third embodiment.
Figure 17:
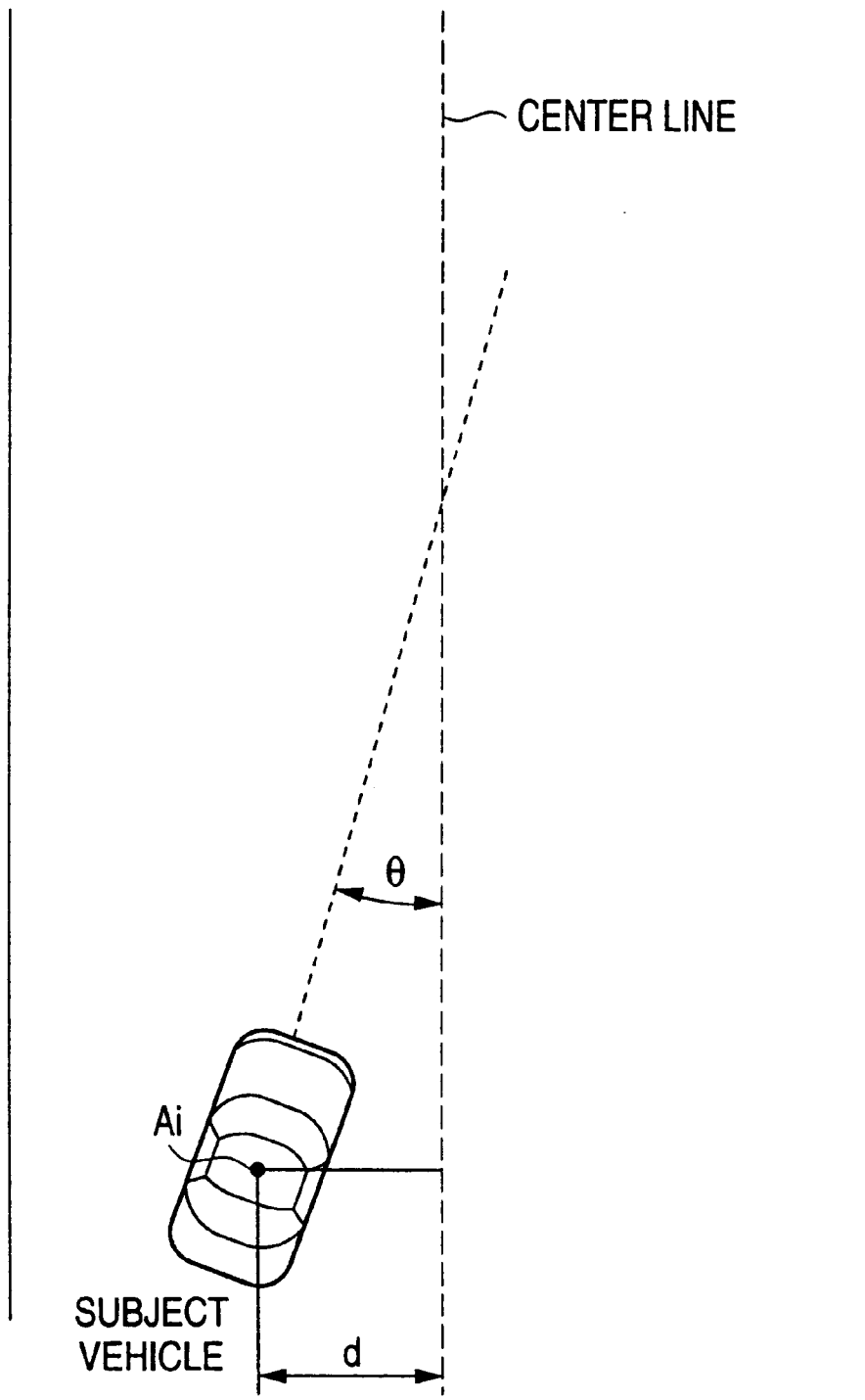
FIG. 17 is a drawing showing a relative relationship between the subject vehicle Ai and running lanes according to the third embodiment.

FIGS. 15 and 16 show an overall structural view of a vehicle provided with a safety running system of the second embodiment of the present invention, and a block diagram of the safety running, respectively. The vehicle shown in FIGS. 15 and 16 has the same equipment as that of the first embodiment except for the steered angle sensor S3. Of course, the vehicle shown in FIGS. 1 and 2 can be applied to the third embodiment. In this embodiment, the image processor 6 calculates an angle θ formed by the center line of the road and the vehicle body axis of the subject vehicle Ai and a distance d between the subject vehicle Ai and the center line based on an image in front of the subject vehicle imaged by the camera 5, as shown in FIG. 17.

In addition, the electronic control unit U includes an electric power steering control unit 11, a head-on collision avoidance control unit 12, a switching unit 13 and an output current determination unit 14 as well as that of the first embodiment shown in FIG. 4. In normal times, the switching unit 13 is connected to the side of the electric power steering control unit 11, and the electric power steering device 2 performs a normal power steering function. In other words, the output current determination unit 14 determines an output current that is to be output to an actuator 15 in response to a steering torque input into the steering wheel 1 and the vehicle velocity, and outputs this output current so determined to the actuator 15 via a driving circuit 16 to thereby assist the driver in operating the steering wheel 1. On the other hand, in a case where there is a possible head-on collision of the subject vehicle Ai with the oncoming vehicle Ao, the switching unit 13 is then connected to the side of the head-on collision avoidance control unit 12 to thereby control the driving of the actuator 15 with the head-on collision avoidance control unit 12, thus effecting automatic steering for avoiding a head-on collision with the oncoming vehicle Ao. The details of this automatic steering will be described at a latter part.

Figure 18:
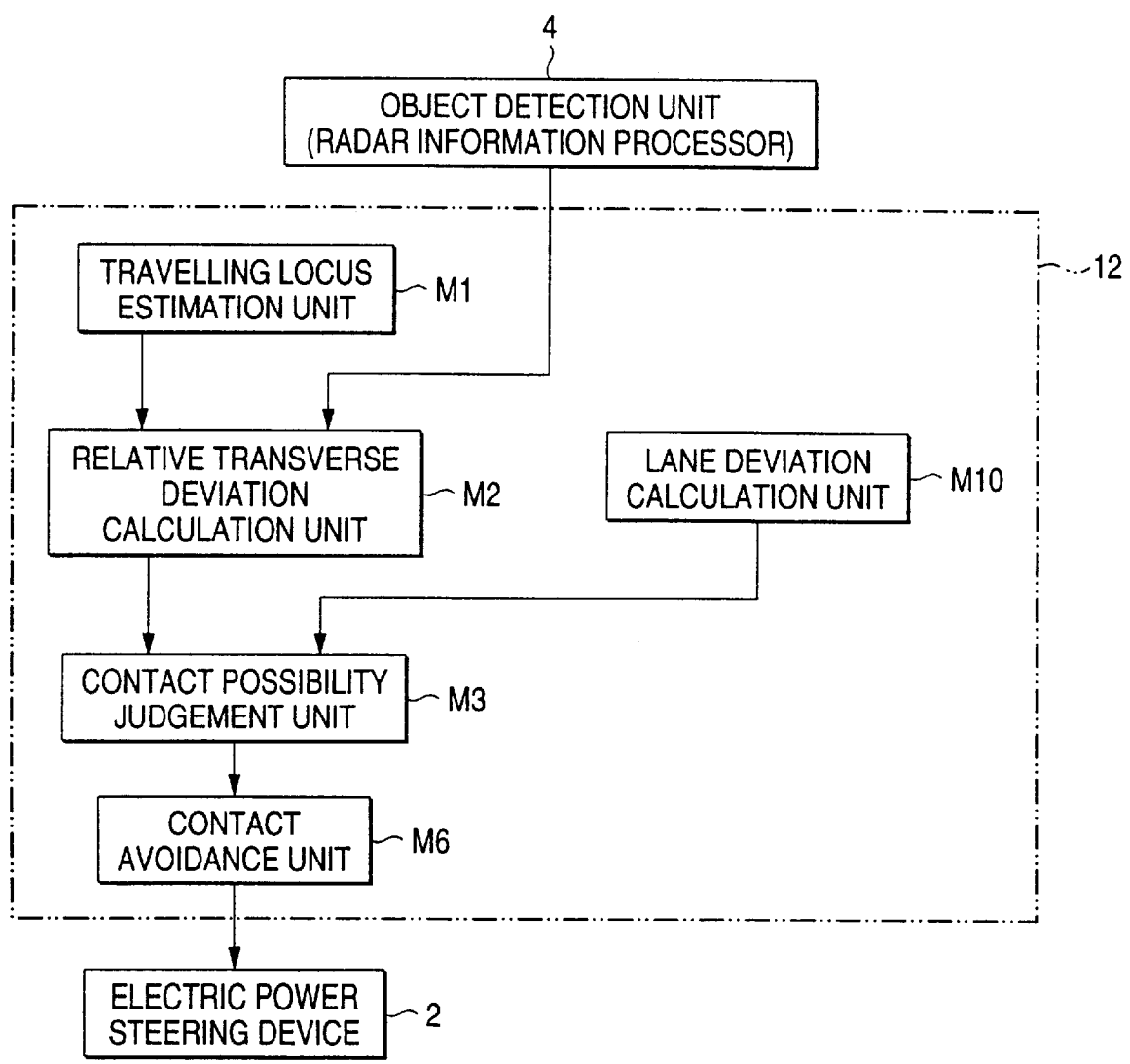
FIG. 18 is a block diagram describing a circuit of a head-on collision avoidance control unit according to the third embodiment.

As shown in FIG. 18, provided in the interior of the head-on collision avoidance control unit 12 of the electronic control unit U are a travelling locus estimation unit M1, a relative transverse deviation calculation unit M2, a contact possibility judgment unit M3, a contact avoidance unit M6, and a lane deviation calculation unit M10.

The travelling locus estimation unit M1 estimates a future travelling locus of the subject vehicle Ai based on the vehicle velocity Vi and yaw rate γi of the subject vehicle Ai. The relative transverse deviation calculation unit M2 calculates a relative transverse deviation ΔY between the subject vehicle Ai and the oncoming vehicle Ao based on the future travelling locus (i.e., the transverse travelling distance $Y_1$) of the subject vehicle Ai and the relative distance ΔL, relative velocity ΔV and angle β between the subject vehicle Ai and the oncoming vehicle. Ao that are detected by the object detection unit 4 (radar information processor 4).

A contact possibility judgment unit M3 once judges that there is a contact possibility of the subject vehicle Ai with the oncoming vehicle when the relative transverse deviation A Y continues to be in a state expressed by $-\epsilon \leq \Delta Y \leq \epsilon$ over a predetermined time period Ts or longer. When this happens, a lane deviation calculating unit M10 calculates a deviation 67 to a running lane for the oncoming vehicle when the subject vehicle Ai meets with the oncoming vehicle Ao and repeatedly judges that there is a contact possibility of the subject vehicle Ai with the oncoming vehicle Ao when the deviation δ is equal to or greater than a predetermined threshold value $\delta_0$. As a result of this, a contact avoidance unit M4 performs contact avoidance steering in order to avoid a contact between the subject vehicle Ai and the oncoming vehicle Ao.

Next, referring to a flowchart shown in FIGS. 19 and 20, an operation of the third embodiment of the present invention will be described.

Figure 19:
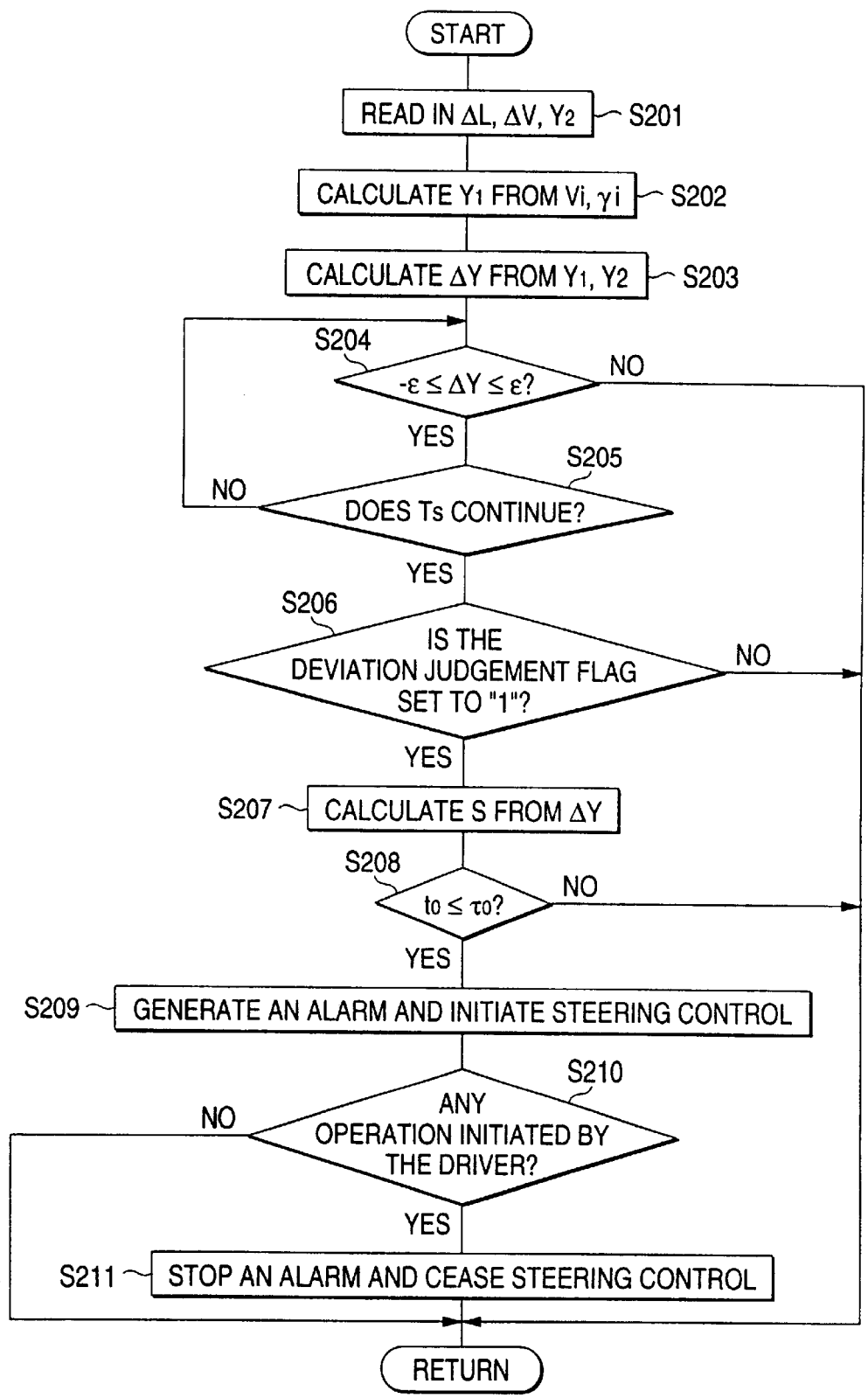
FIG. 19 is a flowchart of a main routine according to the third embodiment.
Figure 20:
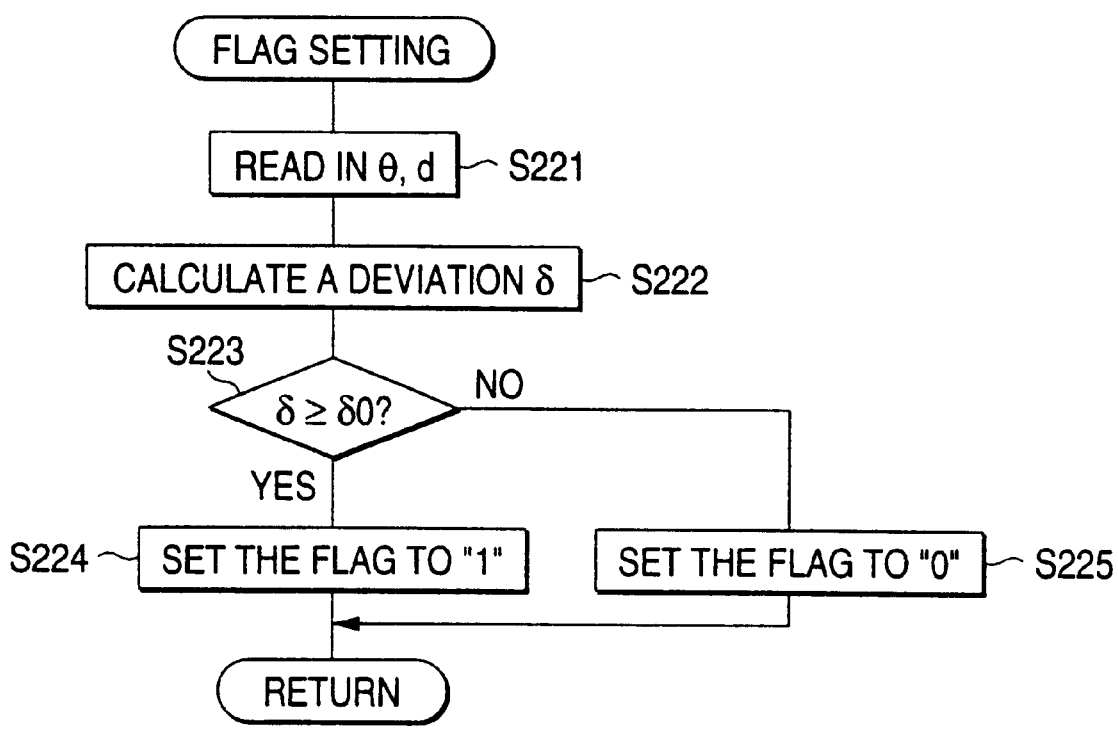
FIG. 20 is a flowchart of flag setting according to the third embodiment.
Figure 21:
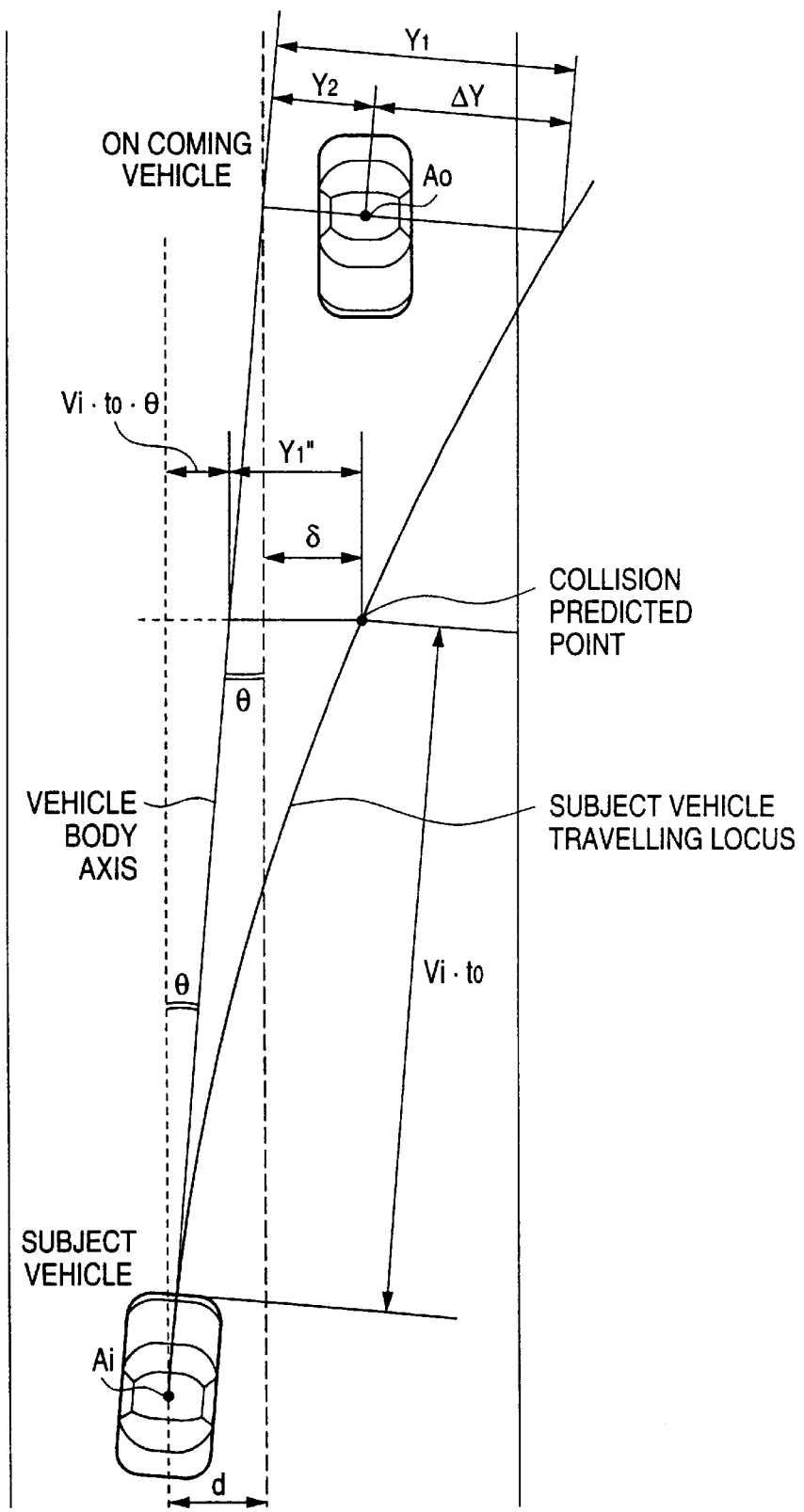
FIG. 21 is an explanatory drawing explaining a procedure for judging a collision possibility.
Figure 22A:
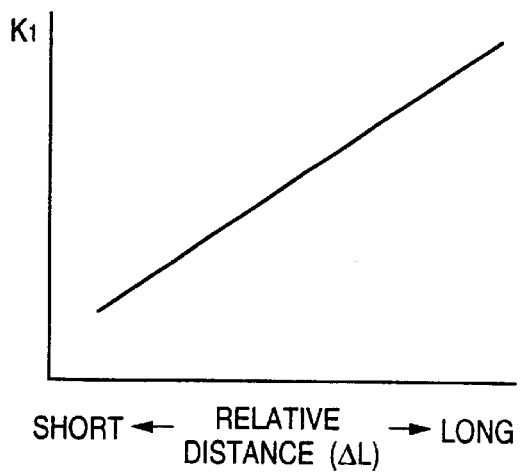
FIGS. 22A and 22B are maps for retrieving correction coefficients $K_1$, $K_2$ for the time period Ts for use for judging a collision possibility according to the third embodiment.
Figure 22B:
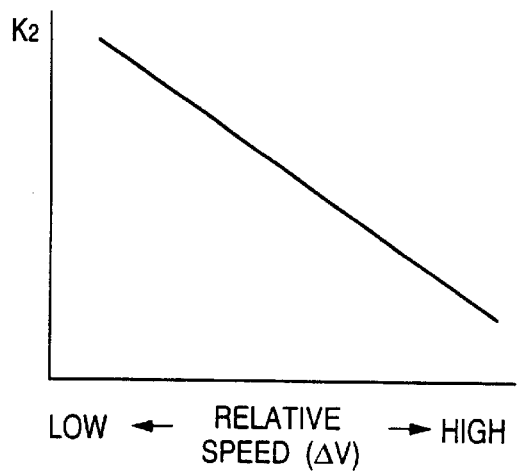

First of all, at Step S201 on the flowchart in FIG. 19, read in the electronic control unit U from the radar information processor 4 are the relative distance ΔL between the subject vehicle Ai and the oncoming vehicle Ao, the relative velocity ΔV between the subject vehicle Ai and the oncoming vehicle Ao, and the relative transverse distance $Y_2$ of the oncoming vehicle Ao relative to the vehicle body axis of the subject vehicle Ai. At the following Step S202, a transverse travelling distance $Y_1$ is calculated based on the vehicle velocity Vi of the subject vehicle Ai detected by the vehicle velocity sensors $S_1$ . . . and the yaw rate γi of the subject vehicle Ai detected by the yaw rate sensor $S_2$. As shown in FIG. 21, the transverse travelling distance $Y_1$ is a transverse distance produced when the subject vehicle Ai travels to the current position of the oncoming vehicle Ao and is calculated as follows. In other words, a transverse travelling distance $Y_1$ of the subject vehicle Ai after the elapse of time $t_1 = \Delta L/Vi$ is obtained by using the vehicle velocity Vi and yaw rate γi of the subject vehicle Ai as follows;

$$Y_1 = (½) \cdot Vi \cdot \gamma i \cdot (\Delta L/Vi)^2 \quad (21)$$

At the following Step S203, a relative transverse deviation $\Delta Y$ is calculated by subtracting the transverse travelling distance $Y_1$ from the relative transverse travelling distance $Y_2$. As is clear from FIG. 21, the relative transverse deviation $\Delta Y$ corresponds to a transverse deviation resulting between the current position of the oncoming vehicle Ao and an estimated position of the subject vehicle Ai when the subject vehicle travels to the current position of the oncoming vehicle Ao. The relative transverse deviation $\Delta Y$ has a positive or negative value, and in the case of the left-hand side traffic described in this embodiment, if the relative transverse deviation $\Delta Y$ has a positive value because of $Y_2 > Y_1$, the estimated travelling locus of the subject vehicle Ai passes on the left-hand side of the current position of the oncoming vehicle Ao. On the other hand, if the relative transverse deviation $\Delta Y$ has a negative value because of $Y_2 < Y_1$, the estimated travelling locus of the subject vehicle Ai passes on the right-hand side of the current position of the oncoming vehicle Ao. In addition, as the absolute value of the relative transverse deviation becomes smaller, the possibility of a contact of the subject vehicle Ai with the oncoming vehicle Ao becomes higher.

At the following Step S204, whether or not the relative transverse deviation $\Delta Y$ resides within a preset range is judged. In other words, if the relative transverse deviation $\Delta Y$ resides within a predetermined range based on a predetermined value ε preset in turn based on the width of the vehicle body of the vehicle (for instance, 2 m), and $$-\epsilon \leq \Delta \leq \epsilon \quad (22)$$

is obtained, it is judged that there is a possible collision of the subject vehicle Ai with the oncoming vehicle Ao, which is a first stage judgment. On the other hand, if the above equation is not obtained, it is judged that the subject vehicle Ai passes through on the left-hand side or right-hand side of the oncoming vehicle Ao, causing no collision, and return to Step S201 without performing alarm or steering control for avoiding a collision.

At the following Step S5, if a state in which the aforesaid equation (22) is obtained continues over the predetermined time period Ts, a second stage judgment of a contact possibility of the subject vehicle Ai with the oncoming vehicle Ao is made. On the other hand, return to and remain at Step S204 until the state in which the aforesaid equation (22) is satisfied is maintained over the predetermined time period Ts. And, if the aforesaid equation (22) becomes untrue before the predetermined time period Ts elapses, an answer to Step S4 becomes No and return to Step S201. The predetermined time period Ts is variable. Assuming that $Ts_0$ regards as a reference value, and $K_1$ and $K_2$ as correction coefficients, and then the following equation is obtained.

$$Ts = Ts_0 \cdot K_1 \cdot K_2 \quad (23)$$

As shown in FIGS. 10A and 10B, the correction coefficients $K_1$, $K_2$ are retrieved from a map with the relative distance $\Delta L$ or the relative velocity $\Delta V$ between the subject vehicle Ai and the oncoming vehicle Ao being designated as a parameter. Thus, the predetermined time Ts is corrected to as to reduce it when there is a high collision possibility because the relative distance $\Delta L$ is short or the relative velocity $\Delta V$ is high. This facilitates the performance of collision avoidance automatic steering when there is a high collision possibility, thereby making it possible to ensure that a collision with the oncoming vehicle is avoided.

At the following Step S206, the state of a deviation judgment flag is judged which represents the magnitude of future deviation of the subject vehicle Ai to the running lane of the oncoming vehicle Ao across the center line. The deviation judgment flag is set to "1" when the magnitude of deviation to the running lane of the oncoming vehicle is large to thereby cause a high collision possibility, and on the contrary, it is reset to "0" when the magnitude of deviation to the running lane of the oncoming vehicle is small to thereby cause only a low collision possibility. Setting or resetting of the deviation judgment flag will be described below based on a flowchart shown in FIG. 20.

First, at Step S221, an angle θ formed by the vehicle body axis of the subject vehicle Ai relative to the center line of the road and a distance d between the subject vehicle Ai and the center line are read in from the image processor 6. At Step S222, a deviation δ of the subject vehicle Ai to the running lane of the oncoming vehicle Ao at a point where a collision between the subject vehicle Ai and the oncoming vehicle Ao is predicted is calculated.

As is clear from FIG. 21, the deviation 6 is given by the following equation.

$$\delta = Vi \cdot t_0 \cdot \theta + Y1'' - d \quad (24)$$

where $t_0$ is a time required until the subject vehicle Ai reaches the collision predicted point and is obtained by dividing the relative distance $\Delta L$ between the subject vehicle Ai and the oncoming vehicle Ao by the relative velocity $\Delta V$ between the subject vehicle Ai and the oncoming vehicle Ao.

$$t_0 = \Delta L/\Delta V \quad (25)$$

The first term on the right-hand side of the equation (24), $Vi \cdot t_0 \cdot \theta$, is obtained by multiplying the distance $Vi \cdot t_0$ between the subject vehicle Ai and the collision predicted point by the angle θ formed by the vehicle body axis of the subject vehicle Ai relative to the center line. In addition, the second term on the right-hand side of the equation, $Y1''$, is the transverse deviation resulting until the subject vehicle Ai reaches the collision predicted point and is obtained with the following equation by using the vehicle velocity Vi and yaw rate γi of the subject vehicle Ai and the time to taken until the subject vehicle Ai reaches the collision predicted point.

$$Y1'' = (½) \cdot Vi \cdot \gamma i \cdot t_0^2 \quad (26)$$

Consequently, the equation (24) is rewritten by using the equation (26) as follows.

$$\delta = Vi \cdot t_0 \cdot \theta + (½) \cdot Vi \cdot \gamma i \cdot t_0^2 - d \quad (27)$$

Thus, the deviation δ is calculated in this way at Step S222, and then at Step S223 following thereto, the deviation δ is compared with a predetermined threshold value $\delta_0$. If the deviation δ is equal to or greater than the threshold value $\delta_0$, a third stage judgment is made that there is a possible collision of the subject vehicle Ai with the oncoming vehicle Ao, and at Step S224, the deviation judgment flag is set to "1". On the other hand, if the deviation δ is less than the threshold value $\delta_0$, it is judged that there is no possible collision of the subject vehicle Ai with the oncoming vehicle Ao, and at Step S225 the deviation judgment flag is set to "0".

Returning to the flowchart shown in FIG. 19, in a case where at the aforesaid Step S206, the deviation judgment flag is set to "1" and there is a possible collision of the subject vehicle Ai with the oncoming vehicle Ao, at Step S207, a target transverse avoidance magnitude S for avoiding the collision is calculated. This target transverse avoidance magnitude S results from addition of the relative transverse deviation $\Delta Y$ calculated at the aforesaid Step S3 and a predetermined value $\alpha$, which is set in advance.

$$S = \Delta Y + \alpha \qquad (28)$$

Figure 23:
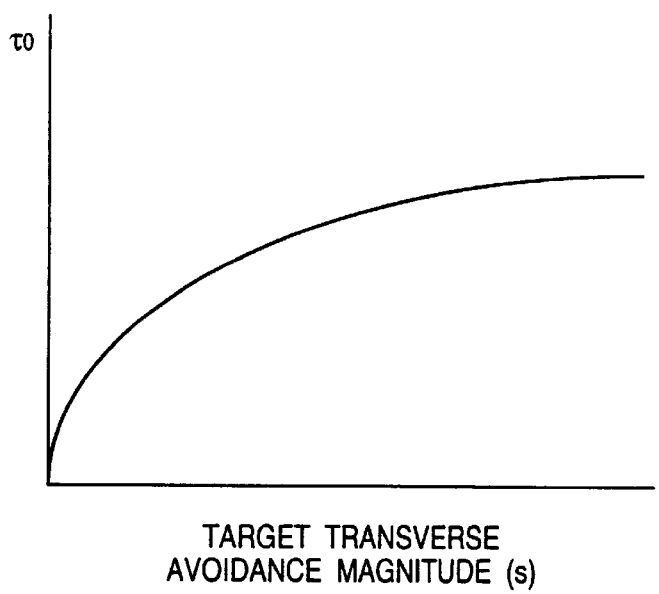
FIG. 23 is a map for retrieving a threshold $\tau_0$ for a target transverse avoidance magnitude S.

At the following Step S208, with a view to determining a timing when a collision avoidance control is initiated, the threshold $\tau_0$ is retrieved from the target transverse avoidance magnitude S based on the map shown in FIG. 23. In order to restrain the occurrence of an excessive transverse acceleration due to automatic steering for avoiding a collision, as the target transverse avoidance magnitude S increases, the threshold $\tau_0$ also increases. Then, when the time $t_0$ taken until the subject vehicle Ai reaches the collision predicted point becomes equal to or less than the threshold $\tau_0$, at Step S209, an indicator 7 and an alarm 8 are activated so as to generate an alarm to the driver and automatic steering is effected so as to avoid a collision.

During the performance of automatic steering in order to avoid a collision, when a voluntary collision avoidance operation by the driver is detected at Step S210, in other words, when it is detected through a steering torque sensor that the driver steers the steering wheel 1 or it is detected through a brake pedal step-down force sensor that the driver applies the vehicle brakes, the generation of an alarm and automatic steering for avoiding a collision are ceased at Step S211. This prevents the interference of the voluntary collision avoidance operation by the driver with the automatic steering, and the collision avoidance operation by the driver overrides the automatic steering, thereby making it possible to eliminate a feeling of physical disorder that would otherwise be felt by the driver.

As has been described heretofore, since the judgment of a possible collision of the subject vehicle Ai with the oncoming vehicle is carried out in separate three stages; first, at the aforesaid Step S204, it is confirmed that the relative transverse deviation $\Delta Y$ resides within a preset range, at Step S205, it is confirmed that the above confirmed state continues for the predetermined time period Ts, and further at Step S206, it is confirmed that the deviation 6 of the subject vehicle Ai to the adjacent lane for opposite traffic is equal to or greater than the threshold value $\delta_0$, the judgment of a possible collision that is finally made becomes highly accurate. In particular, since it is confirmed that the state in which the relative transverse deviation $\Delta Y$ resides within the preset range continues for the predetermined time period Ts, it is prevented that an erroneous judgment of a possible collision is made in response to a temporary yaw movement of the subject vehicle Ai.

Thus, while the embodiments of the present invention has been described in detail heretofore, it should be understood that various modifications and alterations in design may be possible without departing from the spirit and scope of the present invention. In addition, the present invention can be performed by the combination of the above three embodiments.

As described the above, according to the first aspect of the invention, there is provided a safety running system for a vehicle including, an object detection unit for detecting an object existing in a direction in which a subject vehicle travels, a travelling locus estimation unit for estimating a future travelling locus of the subject vehicle, a relative transverse deviation calculation unit for calculating a relative transverse deviation between the subject vehicle and an oncoming vehicle based on the results from the detection by the object detection unit and the future travelling locus of the subject vehicle, a contact possibility judgment unit for judging that there is a contact possibility of the subject vehicle with the oncoming vehicle when the relative transverse deviation calculated by the relative transverse deviation calculation unit falls within a predetermined range, a curve exit detection unit for detecting that the subject vehicle approaches an exit portion of a curve, and a correction unit for correcting the relative transverse deviation based on the results of the detection by the curve exit detection unit.

According to the above construction, the relative transverse calculation unit calculates a relative transverse deviation between the subject vehicle and the oncoming vehicle based on the state of the oncoming vehicle detected by the object detection unit and the future travelling locus of the subject vehicle estimated by the travelling locus estimation unit, and the contact possibility judgment unit judges that there is a contact possibility of the subject vehicle with the oncoming vehicle when the relative transverse deviation resides within the predetermined range. When the curve exit detection unit detects that the subject vehicle approaches the exit portion of the curve, since the correction unit corrects the relative transverse deviation, it is possible to ensure that an erroneous judgment is prevented from being made with high probability at the exit portion of the curve that there is a collision possibility between the subject vehicle and the oncoming vehicle.

In addition, the above safety running system may further includes a contact avoidance unit for performing contact avoidance steering when the contact possibility judgment unit judges that there is a collision possibility between the subject vehicle and the oncoming vehicle.

According to this construction, since the contact avoidance unit performs contact avoidance steering when there is a collision possibility between the subject vehicle and the oncoming vehicle, it is possible to prevent a contact between the subject vehicle and the oncoming vehicle.

Furthermore, the curve exit detection unit may detect that the subject vehicle approaches an exit portion of a curve based on the road conditions in the travelling direction of the subject vehicle imaged by an imaging unit.

According to this construction, since the detection is carried out based on the road conditions in the travelling direction of the subject vehicle imaged by the imaging unit, it is possible to ensure a proper detection.

Moreover, wherein the curve exit detection unit may detect that the subject vehicle approaches an exit portion of a curve based on a steering wheel turning back operation by the driver from a turned condition to a straight travelling condition detected by a steered angle detection unit.

According to this construction, since an exit portion of a curve is detected based on the steering wheel turning back operation by the driver from a turned condition to a straight travelling condition, it is possible to ensure a proper detection.

In addition, the above safety running system may further includes a transverse travelling distance calculation unit for calculating a future transverse travelling distance of the subject vehicle based on the travelling locus estimated by the travelling locus estimation unit and wherein the correction unit corrects the transverse travelling distance such that it is reduced.

According to this construction, since the correction unit corrects the transverse travelling distance such that it is reduced, it is possible to prevent the transverse travelling distance from being calculated at a greater value than an actual one at an exit portion of a curve.

Further, the correction unit may correct the transverse travelling distance such that it becomes shorter as the speed of the steering wheel turning back operation by the driver increases.

According to this construction, since the correction is made such that the transverse travelling distance becomes shorter as the speed of steering wheel turning back operation by the driver becomes higher, it is possible to accurately correct an error in transverse travelling distance at an exit portion of a curve.

In addition, the correction unit may correct the transverse travelling distance such that it becomes shorter as the turning radius at the curve becomes smaller.

According to this construction, since the correction unit corrects the transverse travelling distance such that it becomes shorter as the turning radius at the curve becomes smaller, it is possible to accurately correct an error in transverse travelling distance at an exit portion of a curve.

Further, according to the second aspect of the present invention, there is provided a safety running system including, an object detection unit for detecting an object present in a travelling direction of a subject vehicle, a travelling locus estimation unit for estimating a future travelling locus of the subject vehicle, a relative transverse deviation calculation unit for calculating a relative transverse deviation between the subject vehicle and an oncoming vehicle on an adjacent lane for opposite traffic based on the result of the detection of the object detection unit and a future travelling locus of the subject vehicle estimated by the travelling locus estimation unit, a contact possibility judgment unit for judging that there is a contact possibility of the subject vehicle with the oncoming vehicle when a relative transverse deviation calculated by the relative transverse deviation calculation unit falls within a predetermined range, a contact avoidance unit for automatically performing a contact avoidance operation when the contact possibility judgment unit judges that there is a contact possibility of the subject vehicle with the oncoming vehicle, and an overtaking judgment unit for judging whether or not the subject vehicle is in course of overtaking a preceding vehicle, wherein when the overtaking judgment unit judges that the subject vehicle is in course of overtaking a preceding vehicle, the contact avoidance unit restrains a contact avoidance operation or ceases a contact avoidance operation being performed.

According to the above construction, when the relative transverse deviation calculation unit calculates a relative transverse deviation based on the state of the oncoming vehicle detected by the object detection unit and a future travelling locus of the subject vehicle estimated by the travelling locus estimation unit, and the contact possibility judgment unit judges that the relative transverse deviation so calculated falls within a predetermined range and therefore that there is a contact possibility of the subject vehicle with the oncoming vehicle, the contact avoidance unit automatically performs a contact avoidance operation in order to avoid a contact with the oncoming vehicle, while when the overtaking judgment unit judges that the subject vehicle is in course of overtaking a preceding vehicle, the contact avoidance unit restrains a contact avoidance operation or ceases a contact avoidance operation being performed. Thus, since it is prevented that an unnecessary contact avoidance operation is performed while the driver of the subject vehicle is overtaking a preceding vehicle to thereby interfere with the driver's overtaking operation, it is possible to eliminate a risk of the driver feeling a physical disorder while overtaking the preceding vehicle.

In addition, the contact avoidance operation performed by the contact avoidance unit may steer the steering device of the subject vehicle in a direction opposite to a direction toward the oncoming vehicle which exists in a direction in which the subject vehicle is travelling.

According to this construction, since the contact avoidance unit avoids a contact by steering the steering device in the direction opposite to the direction toward the oncoming vehicle which exists in the direction in which the subject vehicle is travelling, it is possible to ensure that a contact of the subject vehicle with the oncoming vehicle is avoided.

Furthermore, the above safety running system may further includes a steered angle detection unit for detecting a steered angle, and the overtaking judgment unit may judge the initiation of overtaking of a preceding vehicle based on the relative vehicle velocity of the preceding vehicle detected by the object detection unit, the relative distance to the preceding vehicle detected by the object detection unit and a steered angle detected by the steered angle detection unit.

According to this construction, since the overtaking judgment unit judges the initiation of overtaking of the preceding vehicle based on the vehicle velocity of and relative distance to the preceding vehicle and the steered angle of the subject vehicle, it is possible to make a judgment more accurately than a case where a judgment of the initiation of overtaking of a preceding vehicle is made based only on a steered angle.

In addition, the above system may further includes a vehicle velocity detection unit for detecting the vehicle velocity of the subject vehicle and a preceding vehicle's vehicle velocity calculating unit for calculating the vehicle velocity of the preceding vehicle based on the relative vehicle velocity of the preceding vehicle and the vehicle velocity of the subject vehicle detected by the vehicle velocity detection unit, and the overtaking judgment unit may judge the completion of overtaking of the preceding vehicle based on a travel distance of the subject vehicle calculated from the vehicle velocity of the subject vehicle and a travel distance of the preceding vehicle calculated from the vehicle velocity of the preceding vehicle and a relative distance to the preceding vehicle when an overtaking is initiated.

According to this construction, since the overtaking judgment unit judges the completion of overtaking of the preceding vehicle based on the travel distance of the subject vehicle, the travel distance of the preceding vehicle and the relative distance to the preceding vehicle when the overtaking is initiated, it is possible to make an accurate judgment of a completion of overtaking without using a side sensor for detecting a preceding vehicle from the side thereof.

In addition, wherein the ceasing of a contact avoidance operation by the contact avoidance unit may be performed by a delay in timing when the steering device is operated or reduction in amount in which the steering device is steered.

According to this construction, since the contact avoidance unit delays the timing when the steering device is operated or reduces the amount in which the steering device is steered, it is possible to accurately cease a contact avoidance operation while a preceding vehicle is being overtaken.

Further, according to the third aspect of the present invention, there is provided a safety running system comprising, an object detection unit for detecting an object present in a travelling direction of a subject vehicle, a travelling locus estimation unit for estimating a future travelling locus of the subject vehicle, a relative transverse deviation calculation unit for calculating a relative transverse deviation between the subject vehicle and an oncoming vehicle on an adjacent lane for opposite traffic based on the result of the detection of the object detection unit and a future travelling locus of the subject vehicle estimated by the travelling locus estimation unit, a contact possibility judgment unit for judging that there is a contact possibility of the subject vehicle with the oncoming vehicle when a state in which a relative transverse deviation calculated by the relative transverse deviation calculation unit remains within a predetermined range continues for a predetermined time period or longer, and a contact avoidance unit for performing contact avoidance steering when the contact possibility judgment unit judges that there is a contact possibility of the subject vehicle with the oncoming vehicle.

According to the above construction, when the relative transverse deviation calculation unit calculates a relative transverse deviation based on the state of the oncoming vehicle detected by the object detection unit and the future travelling locus of the subject vehicle estimated by the travelling locus estimation unit. When the state in which the relative transverse deviation remains within the predetermined range continues for the predetermined time period or longer, the contact possibility judgment unit judges that there is a contact possibility of the subject vehicle with the oncoming vehicle, and the contact avoidance unit performs contact avoidance steering in order to avoid a contact of the subject vehicle with the oncoming vehicle. Thus, since the contact avoidance steering is performed on condition that the state in which the relative transverse deviation remains within the predetermined range continues for the predetermined time period or longer, it is possible to ensure that a risk is avoided in which an erroneous judgment of a collision possibility is made in response to a temporary yaw movement of the subject vehicle when in reality there is no risk of collision with the oncoming vehicle, thereby making it possible to prevent the driver from feeling a physical disorder that would be caused when unnecessary contact avoidance steering is performed.

In addition, the above safety running system may further includes a lane deviation calculation unit for calculating a deviation of the subject vehicle from its running lane to a running lane for the oncoming vehicle when the subject vehicle meets with the oncoming vehicle, and the contact possibility judgment unit may judge that there is a collision possibility of the subject vehicle with the oncoming vehicle when a deviation calculated by the lane deviation calculation unit is equal to or greater than a predetermined threshold value.

According to this construction, since the deviation of the subject vehicle from its running lane to the running lane for the oncoming vehicle when the subject vehicle meets with the oncoming vehicle is calculated by the lane deviation calculation unit and it is judged that there is a collision possibility of the subject vehicle with the oncoming vehicle when the deviation is equal to or greater than the predetermined threshold value, it is possible to improve the judgment accuracy when compared with a case where whether or not there is a contact possibility is judged only on the relative relationship between the subject vehicle and the oncoming vehicle.

Furthermore, the predetermined time period may be set shorter as the relative distance between the subject vehicle and the oncoming vehicle becomes shorter or the relative velocity between the subject vehicle and the oncoming vehicle becomes greater.

According to this construction, since the predetermined time period for use for judgment of the continuity of the state in which the relative transverse deviation remains within the predetermined range is set shorter as the relative distance between the subject vehicle and the oncoming vehicle becomes shorter or the relative velocity between the subject vehicle and the oncoming vehicle becomes greater, the higher the contact possibility becomes, the easier the contact avoidance steering is performed, thereby making it possible to ensure that a contact with the oncoming vehicle is avoided.

In addition, the contact avoidance unit may initiate the contact avoidance steering when the time taken until the subject vehicle meets with the oncoming vehicle becomes equal to or less than a predetermined threshold value.

According to this construction, since the contact avoidance steering is initiated when the time taken until the subject vehicle meets with the oncoming vehicle becomes equal to or less than a predetermined threshold value, it is possible to avoid a risk in which the contact avoidance steering is initiated earlier than required so as to interfere with a voluntary contact avoidance operation by the driver.

Furthermore, a target avoidance magnitude may be set based on the relative transverse deviation calculated by the relative transverse deviation calculating unit.

According to this construction, since the target avoidance magnitude for the contact avoidance unit is set based on the relative transverse deviation between the subject vehicle and the oncoming vehicle, the target avoidance magnitude can be set accurately neither too much nor too less.

Moreover, the contact avoidance steering by the contact avoidance unit may be ceased when a voluntary contact avoidance operation by the driver is detected.

According to this construction, since the contact avoidance steering by the contact avoidance unit is ceased when a contact avoidance operation is performed by the driver, it is possible to securely prevent the interference of the voluntary operation by the driver with the contact avoidance steering.

The present disclosure relates to the subject matter contained in Japanese patent application Nos. Hei.10-233733 filed on Aug. 20, 1998, Hei.10-238543 filed on Aug. 25, 1998 and Hei.10-238545 filed on Aug. 25, 1998, which are expressly incorporated herein by reference in its entirety.

What is claimed is:

1. A safety running system for a vehicle comprising:
a detection unit detecting an object existing in a direction in which a subject vehicle travels;
a travelling locus estimation unit estimating a future travelling locus of the subject vehicle;
a relative transverse deviation calculation unit calculating a relative transverse deviation between the subject vehicle and an oncoming vehicle based on the results of the detection by said object detection unit and said future travelling locus of the subject vehicle;
a contact possibility judgment unit judging that there is a contact possibility of the subject vehicle with the oncoming vehicle when a state in which the relative transverse deviation calculated by said relative transverse deviation calculation unit is within a predetermined range continues for a predetermined time period or longer; and
a contact avoidance unit performing contact avoidance steering when said contact possibility judgment unit judges that there is a contact possibility of the subject vehicle with the oncoming vehicle.

2. A safety running system for a vehicle according to claim 1, further comprising:

a lane deviation calculation unit calculating a deviation of the subject vehicle from its running lane to a running lane for the oncoming vehicle when the subject vehicle meets with the oncoming vehicle, wherein said contact possibility judgment unit judges that there is a collision possibility of the subject vehicle with the oncoming vehicle when the deviation calculated by said lane deviation calculation unit is equal to or greater than a predetermined threshold value.

3. A safety running system for a vehicle according to claim 1, wherein the predetermined time period is set shorter as the relative distance between the subject vehicle and the oncoming vehicle becomes shorter.

4. A safety running system for a vehicle according to claim 1, wherein the predetermined time period is set shorter as the relative velocity between the subject vehicle and the oncoming vehicle becomes greater.

5. A safety running system for a vehicle according to claim 1, wherein said contact avoidance unit initiates the contact avoidance steering when a time taken until the subject vehicle meets with the oncoming vehicle becomes equal to or less than a predetermined threshold value.

6. A safety running system for a vehicle according to claim 1, wherein a target avoidance magnitude of said contact avoidance unit is set based on the relative transverse deviation calculated by said relative transverse deviation calculating unit.

7. A safety running system for a vehicle according to claim 1, wherein the contact avoidance steering by said contact avoidance unit is ceased when a voluntary contact avoidance operation by the driver is detected.

* * * * *